US009751452B2

United States Patent
Orazem

(10) Patent No.: US 9,751,452 B2
(45) Date of Patent: Sep. 5, 2017

(54) METHOD AND APPARATUS FOR INSTALLING AND OPERATING AN AUXILIARY LIGHTING SYSTEM USING A VEHICLE LIGHT PLUG

(71) Applicant: Meyer Products, LLC, Cleveland, OH (US)

(72) Inventor: Louis Orazem, Cleveland, OH (US)

(73) Assignee: Meyer Products, LLC, Cleveland, OH (US)

( * ) Notice: Subject to any disclaimer, the term of this patent is extended or adjusted under 35 U.S.C. 154(b) by 0 days.

(21) Appl. No.: 15/356,618

(22) Filed: Nov. 20, 2016

(65) Prior Publication Data

US 2017/0066363 A1 Mar. 9, 2017

Related U.S. Application Data

(63) Continuation-in-part of application No. 14/622,211, filed on Feb. 13, 2015, now abandoned.

(Continued)

(51) Int. Cl.
*B60Q 11/00* (2006.01)
*B60Q 1/00* (2006.01)
(Continued)

(52) U.S. Cl.
CPC .......... *B60Q 1/0088* (2013.01); *B60Q 1/076* (2013.01); *B60Q 1/18* (2013.01); *B60Q 1/30* (2013.01); *B60Q 1/305* (2013.01); *B60Q 1/34* (2013.01); *E01H 5/061* (2013.01); *F21S 48/1742* (2013.01); *F21V 23/06* (2013.01); *G08C 17/02* (2013.01); *H05B 37/0227* (2013.01);
(Continued)

(58) Field of Classification Search
CPC ............ H05B 33/0815; H05B 33/0818; H05B 33/0884; H05B 33/0809; H05B 33/0848; H05B 33/0896; H05B 37/029; H05B 37/0245; H05B 37/0254; H05B 41/3925; H05B 41/391; H05B 41/2828; H05B 33/0803; B60Q 1/22; B60Q 5/10; B60Q 1/305
USPC .................. 315/294; 340/431, 294, 463, 985
See application file for complete search history.

(56) References Cited

U.S. PATENT DOCUMENTS

| | | |
|---|---|---|
| 4,280,062 A | 7/1981 | Miller |
| 4,781,393 A | 11/1988 | Jeter |

(Continued)

FOREIGN PATENT DOCUMENTS

DE 29700668 3/1997

OTHER PUBLICATIONS

International Search Report and Written Opinion, PCT/US2016/013731, European Patent Office, dated May 6, 2016.

*Primary Examiner* — Douglas W Owens
*Assistant Examiner* — Syed M Kaiser
(74) *Attorney, Agent, or Firm* — Roger D. Emerson; Emerson Thomson Bennett, LLC

(57) ABSTRACT

An auxiliary lighting system using a vehicle's electric plug is disclosed. A signal may be transmitted from the plug to an auxiliary implement attached to a vehicle. The signal may be sent through a wire bundle (wiring harness). The auxiliary lighting system does not require rewiring of the vehicle's wiring harness. A normally closed relay pack is included with the auxiliary lighting system that prevents simultaneous operation of the vehicle's headlights and the auxiliary lighting system.

20 Claims, 23 Drawing Sheets

Related U.S. Application Data

(60) Provisional application No. 62/104,570, filed on Jan. 16, 2015.

(51) Int. Cl.

| | | |
|---|---|---|
| *B60Q 1/076* | (2006.01) | |
| *B60Q 1/18* | (2006.01) | |
| *B60Q 1/30* | (2006.01) | |
| *B60Q 1/34* | (2006.01) | |
| *F21S 8/10* | (2006.01) | |
| *F21V 23/06* | (2006.01) | |
| *H05B 37/02* | (2006.01) | |
| *E01H 5/06* | (2006.01) | |
| *G08C 17/02* | (2006.01) | |
| *H05B 33/08* | (2006.01) | |

(52) U.S. Cl.
CPC ..... *H05B 37/0263* (2013.01); *H05B 37/0272* (2013.01); *B60Q 2900/30* (2013.01); *H05B 33/0806* (2013.01)

(56) References Cited

U.S. PATENT DOCUMENTS

| | | | |
|---|---|---|---|
| 5,420,480 A | 5/1995 | Knepel et al. | |
| 5,524,368 A | 6/1996 | Struck et al. | |
| 5,607,221 A | 3/1997 | Justus | |
| 5,769,526 A | 6/1998 | Shaffer | |
| 5,828,299 A | 10/1998 | Chen | |
| 5,841,203 A | 11/1998 | Chambers | |
| 5,904,261 A | 5/1999 | Belinky et al. | |
| 5,971,799 A | 10/1999 | Swade | |
| 6,005,300 A | 12/1999 | Kelly | |
| 6,112,139 A | 8/2000 | Schubert et al. | |
| 6,138,388 A | 10/2000 | Kost et al. | |
| 6,259,170 B1 * | 7/2001 | Limoge | B60Q 1/305 307/10.1 |
| 6,265,829 B1 | 7/2001 | Perdec | |
| 6,322,238 B1 | 11/2001 | Barr | |
| 6,362,727 B1 | 3/2002 | Guy, Jr. | |
| 6,396,210 B1 | 5/2002 | Menze | |
| 6,504,306 B2 | 1/2003 | Menze | |
| 6,700,310 B2 | 3/2004 | Maue et al. | |
| RE38,665 E | 12/2004 | Struck et al. | |
| 7,137,724 B2 | 11/2006 | Menze et al. | |
| 7,224,262 B2 | 5/2007 | Simon et al. | |
| 7,279,640 B2 | 10/2007 | White et al. | |
| 7,290,359 B2 * | 11/2007 | Potak | B60R 9/06 172/272 |
| 7,341,264 B2 | 3/2008 | Swannie | |
| 7,400,058 B1 | 7/2008 | Wayne et al. | |
| 7,463,136 B2 | 12/2008 | Ungerman | |
| 7,557,699 B2 | 7/2009 | Walton | |
| 7,661,210 B2 | 2/2010 | Shepherd | |
| 7,973,651 B2 | 7/2011 | Stiles et al. | |
| 8,061,879 B2 | 11/2011 | Simmons et al. | |
| 8,068,961 B2 | 11/2011 | Menze | |
| 8,185,276 B2 | 5/2012 | Buckbee et al. | |
| 8,203,445 B2 | 6/2012 | Recker et al. | |
| 8,552,852 B1 | 10/2013 | Hertz et al. | |
| 9,278,645 B1 * | 3/2016 | Orazem | B60Q 1/0088 |
| 2003/0098786 A1 * | 5/2003 | Bishop | B60Q 1/22 340/435 |
| 2004/0056779 A1 * | 3/2004 | Rast | B63B 22/16 340/985 |
| 2005/0047031 A1 | 3/2005 | Naito | |
| 2005/0152145 A1 * | 7/2005 | Currie | B60Q 1/305 362/294 |
| 2007/0120654 A1 | 5/2007 | Walton | |
| 2008/0073090 A1 | 3/2008 | Harris | |
| 2008/0079552 A1 | 4/2008 | Schultz | |
| 2008/0224843 A1 * | 9/2008 | Overline | B60Q 1/22 340/463 |
| 2008/0272699 A1 * | 11/2008 | Capenos | B60Q 1/0088 315/77 |
| 2010/0060439 A1 * | 3/2010 | Fitzgerald | B60Q 1/22 340/431 |
| 2011/0237090 A1 * | 9/2011 | Ehrlich | B60Q 1/0088 439/36 |
| 2012/0134389 A1 | 5/2012 | Pahlavan et al. | |
| 2014/0022389 A1 * | 1/2014 | Kageta | H04N 7/183 348/148 |
| 2014/0052335 A1 | 2/2014 | Moon, Jr. et al. | |
| 2016/0035156 A1 * | 2/2016 | Andrus | G07C 5/0808 701/34.4 |
| 2016/0121792 A1 * | 5/2016 | Christopherson | B60D 1/64 340/431 |

\* cited by examiner

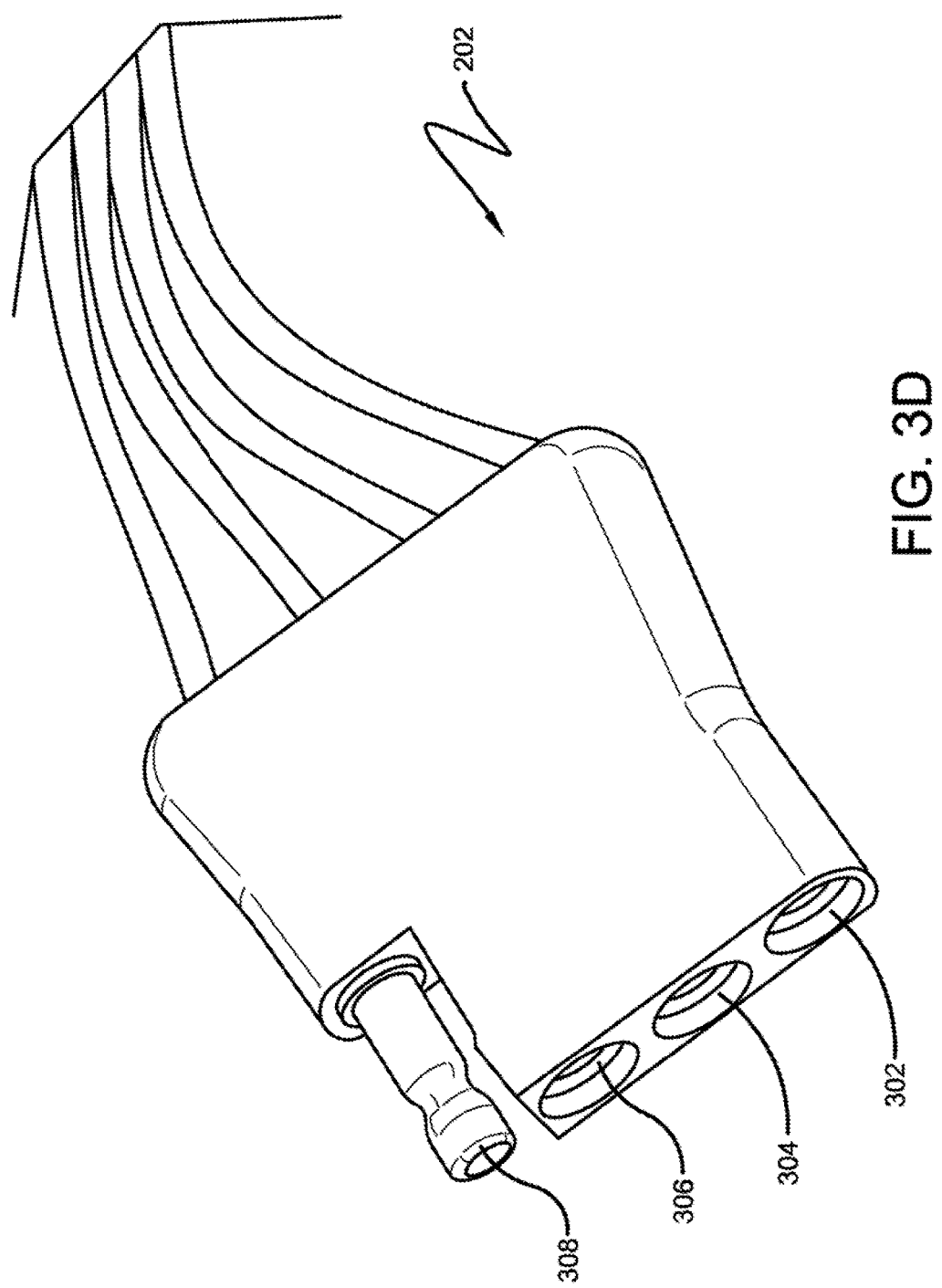

METHOD AND APPARATUS FOR INSTALLING AND OPERATING AN AUXILIARY LIGHTING SYSTEM USING A VEHICLE LIGHT PLUG

This application is a continuation-in-part of U.S. patent application Ser. No. 14/622,211, filed Feb. 13, 2015, which claims priority to U.S. Provisional Patent Application No. 62/104,570, filed Jan. 16, 2015, the contents of which are incorporated herein by reference.

TECHNICAL FIELD

This invention relates to a method for installing and operating an auxiliary lighting system using a vehicle's electric plug.

BACKGROUND

When an auxiliary implement, such as a snowplow, is mounted onto the front of a vehicle, the vehicle's headlights and turn signals are commonly obscured. Therefore, vehicle-mounted auxiliary implements often include an auxiliary lighting system which includes auxiliary headlights and turn signals which operate instead of (or in addition to) the vehicle's headlights and turn signals.

Such auxiliary lighting systems typically require numerous connections to the vehicle's electronic lighting system so that the auxiliary headlights and turn signals can be coordinated, powered, and controlled by the vehicle's existing electrical system. Current installation techniques involve disconnecting the vehicle's original equipment manufacturer's ("OEM") wiring harness and splicing or otherwise connecting the new wiring harness for the auxiliary lighting to the OEM wiring. This part of the process is labor intensive and objectionable as it requires altering the vehicle's existing electrical system. For example, the time necessary to initially install and mount a snowplow that utilizes an auxiliary lighting system to a vehicle is approximately four hours. The process of installing the wiring harness consumes approximately two and one half hours of that time. FIG. 12 shows a schematic representation of a typical snowplow attached to a vehicle (shown in phantom) according to existing systems. The numerous wires or wire bundles 410 indicate typical wiring required to be installed in order to interconnect the vehicle battery, the user operated controller, the plow lamps, and the plow's hydraulic unit. Such connections typically require cutting and splicing of numerous wires. Thus, an electrical technician is required to assure that proper connections have been made.

Therefore, a simpler installation process would reduce the amount of time and effort necessary to install an auxiliary implement utilizing an auxiliary lighting system and would eliminate the need for major alterations to the vehicle's OEM electrical systems.

Many vehicles that are suited to operate an auxiliary implement, such as a snowplow or spreader, are trucks or other vehicles that include trailer hitches that include a hitch receiver and a trailer plug. It is believed that approximately 95% of trucks currently manufactured feature trailer hitches. More recently, manufacturers offer trucks with towing packages, including a hitch receiver and a trailer plug, installed as standard equipment. Trucks that do not include these features as standard equipment from the manufacturer have the towing package available as an option from the factory. Vehicles other than trucks, such as cars and all-terrain vehicles (also known as "ATV's") may also offer such hitch receivers and trailer plugs and may also be candidates for embodiments of this invention.

"Trailer plugs" are a type of electric connector positioned at the rear end of vehicles, such as a pickup truck, usually near a hitch receiver. Each trailer plug is positioned at one end of a trailer wiring harness. Trailer plugs come in multiple varieties and are designed to power and control trailer features such as brake lights, turn signals, running lights, and the like. The two most common trailer plugs are the 7-way plug and the 4-way plug. Many trucks now come with the 7-way plug installed from the factory, as discussed above. Other common plugs include a 6-way, a 5-way, and a 4-way plug. There are also a wide variety of European type trailer plugs with different wiring configurations than those just described.

SUMMARY

According to some embodiments of this invention, an auxiliary apparatus may be used with an associated vehicle having: at least one vehicle light wherein the at least one vehicle light includes a headlight having a low beam and a high beam; an operator adjustable light control that permits a user to control the vehicle light, a battery; and, an electric plug that is electrically connected to the vehicle light. The auxiliary apparatus may comprise: an auxiliary snow and/or ice removal implement that is removably mountable to the associated vehicle; an auxiliary lighting system that: (1) is designed for use with the auxiliary implement; (2) has at least one auxiliary light designed to illuminate a ground surface upon which the associated vehicle travels; and, (3) the at least one auxiliary light includes a low beam and a high beam; a user operable device that is designed to operate at least one function of the auxiliary snow and/or ice removal implement; a first wiring harness that: (1) has a first electrical connector that is a power connector; (2) has a second electrical connector that is electrically connectable to the at least one auxiliary light; (3) has a third electrical connector that is electrically hardwire connectable to the auxiliary implement; and, (4) has a fourth electrical connector; a second wiring harness that: (1) has a first end that is electrically connectable to the vehicle battery; (2) has a second end with a power connector that is electrically hardwire connectable to the power connector of the first wiring harness; and, (3) is designed to transmit power from the vehicle battery to the power connector of the first wiring harness to power the auxiliary snow and/or ice removal implement; a third wiring harness that: (1) has a first connector that is electrically hardwire connectable to the vehicle electric plug; (2) has a second connector that is electrically hardwire connectable to the fourth electrical connector of the first wiring harness; (3) has a third connector that is designed to be connected to the user operable device; and, (4) is designed to transmit an electrical signal from the vehicle electric plug to the first wiring harness; and a relay pack that: (1) has a first and second normally closed relay that are electrically connectable to the vehicle headlight low beam, the at least one auxiliary light low beam, and the user operable device; (2) has a third and fourth normally closed relay that are electrically connectable to the vehicle headlight high beam, the at least one auxiliary light high beams, and the user operable device. When the first, second, and third wiring harnesses are connected: (1) the user operable device may be operable to operate the at least one function of the auxiliary snow and/or ice removal implement; and, (2) the operator adjustable light control may be operable to control the at least one auxiliary light.

According to other embodiments of this invention, a method may be used with an associated vehicle having: at least one vehicle light wherein the at least one vehicle light includes a headlight having a low beam and a high beam; an operator adjustable light control that permits a user to control the vehicle light, a battery; and, an electric plug that is electrically connected to the vehicle light. The method may comprise the steps of: (A) providing an auxiliary apparatus comprising: an auxiliary snow and/or ice removal implement comprising at least one operable function; an auxiliary lighting system that: (1) is designed for use with the auxiliary implement; (2) has at least one auxiliary light designed to illuminate a ground surface upon which the associated vehicle travels; and, (3) the at least one auxiliary light includes a low beam and a high beam; a user operable device that is designed to operate the at least one operable function of the auxiliary snow and/or ice removal implement; a first wiring harness that: (1) has a first electrical connector that is a power connector; (2) has a second electrical connector that is electrically connectable; (3) has a third electrical connector that is electrically hardwire connectable; and, (4) has a fourth electrical connector; a second wiring harness that: (1) has a first end; and, (2) has a second end with a power connector that is electrically hardwire connectable; a third wiring harness that: (1) has a first connector that is electrically hardwire connectable; (2) has a second connector that is electrically hardwire connectable; and, (3) has a third connector; and, a relay pack that: (1) has a first and second normally closed relay that are electrically connectable to the vehicle headlight low beam, the at least one auxiliary light low beam, and the user operable device; (2) has a third and fourth normally closed relay that are electrically connectable to the vehicle headlight high beam, the at least one auxiliary light high beams, and the user operable device. The auxiliary apparatus may be operable according to the following steps: (B) mounting the auxiliary snow and/or ice removal implement to the associated vehicle; (C) mounting the auxiliary lighting system to at least one of: (1) the auxiliary snow and/or ice removal implement; and, (2) the associated vehicle; (D) securing the first, second, and third wiring harnesses to at least one of: (1) the auxiliary snow and/or ice removal implement; and, (2) the associated vehicle; (E) electrically connecting the second electrical connector of the first wiring harness to the at least one auxiliary light; (F) electrically hardwire connecting the third electrical connector of the first wiring harness to the auxiliary implement; (G) electrically connecting the first end of the second wiring harness to the vehicle battery; (H) electrically hardwire connecting the power connector of the second wiring harness to the power connector of the first wiring harness to enable power to be transmitted from the vehicle battery to the auxiliary snow and/or ice removal implement; (I) electrically hardwire connecting the first connector of the third wiring harness to the vehicle electric plug; (J) electrically hardwire connecting the second connector of the third wiring harness to the fourth electrical connector of the first wiring harness; (K) electrically hardwire connecting the third connector of the third wiring harness to the user operable device to enable an electric signal to be transmitted from the vehicle electric plug to the first wiring harness; (L) manually operating the user operable device to operate the at least one function of the auxiliary snow and/or ice removal implement; and, (M) manually operating the operator adjustable light control to control the at least one auxiliary light.

According to still other embodiments of this invention, an apparatus may comprise: a vehicle comprising: at least one vehicle light wherein the at least one vehicle light includes a headlight having a low beam and a high beam; an operator adjustable light control that permits a user to control the vehicle light, a battery; and, an electric plug that is electrically connected to the vehicle light; an auxiliary snow and/or ice removal implement that is removably mountable to the vehicle; an auxiliary lighting system that: (1) is designed for use with the auxiliary implement; (2) has at least one auxiliary light designed to illuminate a ground surface upon which the vehicle travels; and, (3) the at least one auxiliary light includes a low beam and a high beam; a user operable device that is designed to operate at least one function of the auxiliary snow and/or ice removal implement; a first wiring harness that: (1) has a first electrical connector that is a power connector; (2) has a second electrical connector that is electrically connected to the at least one auxiliary light; (3) has a third electrical connector that is electrically hardwire connected to the auxiliary implement; and, (4) has a fourth electrical connector; a second wiring harness that: (1) has a first end that is electrically connected to the vehicle battery; (2) has a second end with a power connector that is electrically hardwire connected to the power connector of the first wiring harness; and, (3) transmits power from the vehicle battery to the auxiliary snow and/or ice removal implement; a third wiring harness that: (1) has a first connector that is electrically hardwire connected to the vehicle electric plug; (2) has a second connector that is electrically hardwire connected to the fourth electrical connector of the first wiring harness; (3) has a third connector that is connected to the user operable device; and, (4) transmits an electrical signal from the vehicle electric plug to the first wiring harness; and, a relay pack that: (1) has a first and second normally closed relay that are electrically connectable to the vehicle headlight low beam, the at least one auxiliary light low beam, and the user operable device; (2) has a third and fourth normally closed relay that are electrically connectable to the vehicle headlight high beam, the at least one auxiliary light high beams, and the user operable device. The user operable device may be operable to operate the at least one function of the auxiliary snow and/or ice removal implement. The operator adjustable light control may be operable to control the at least one auxiliary light.

Numerous benefits and advantages of this invention will become apparent to those skilled in the art to which it pertains upon reading and understanding of the following detailed specification.

DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 3D is a close-up, perspective view of a 4-way plug.

DETAILED DESCRIPTION

Figure 1:
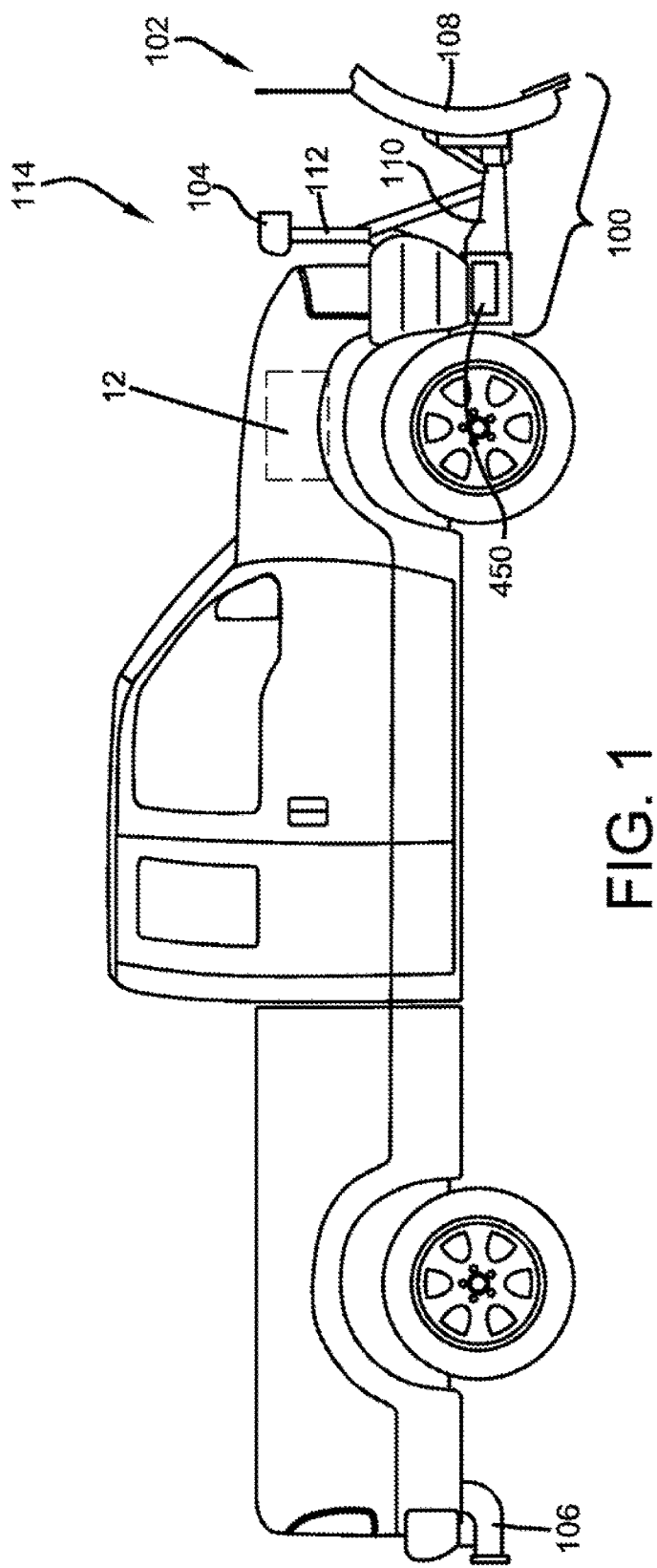
FIG. 1 is a side view of a vehicle with a snowplow implement and trailer plug.
Figure 1A:
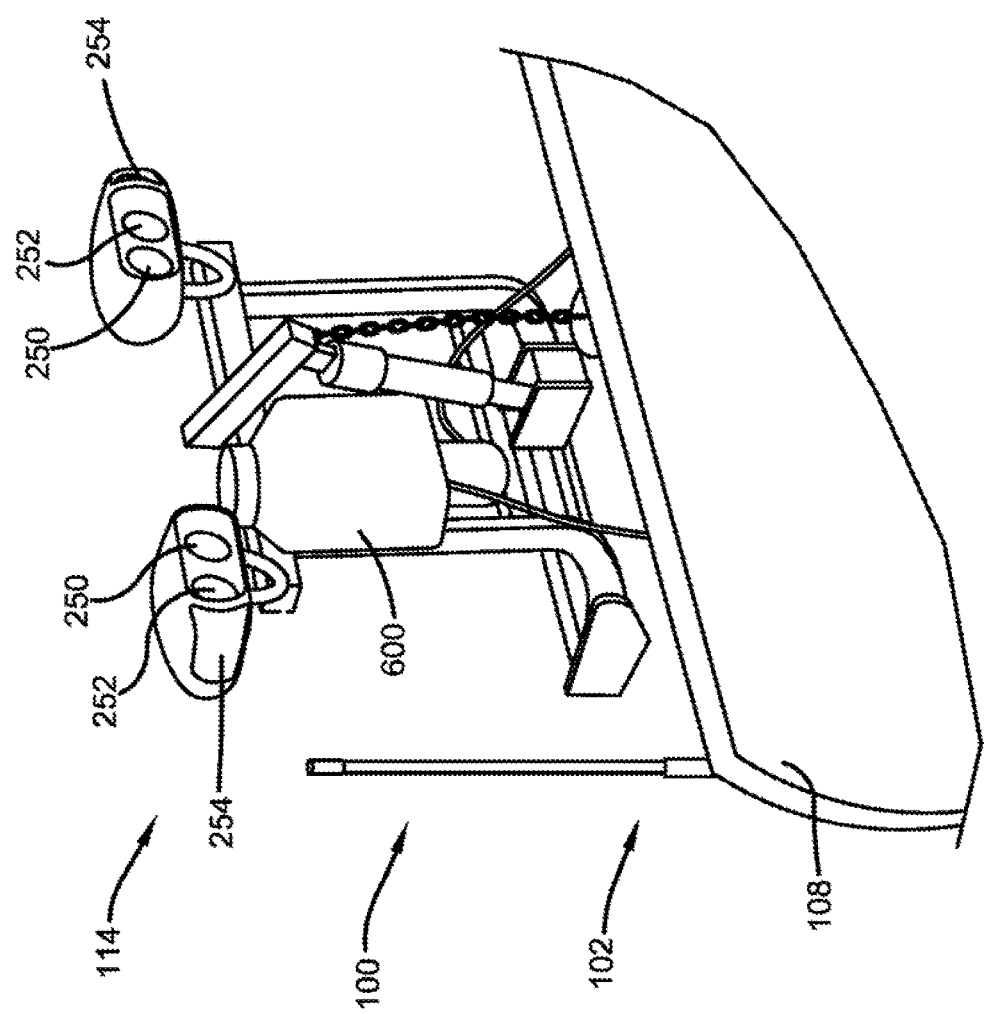
FIG. 1A is a front perspective view of a snowplow implement.

With reference to FIG. 1, an auxiliary lighting system 114 having at least one auxiliary light 104 is shown installed on the front end of a vehicle having a trailer hitch 106 at its rear end. For the embodiment shown, the auxiliary lighting system 114 is part of an auxiliary implement 100 that is a snowplow assembly 102. This invention, however, may be used with any auxiliary lighting system chosen with the sound judgment of a person of skill in the art. FIG. 1A shows an auxiliary lighting system 114 including the following auxiliary lights: right and left blinker lights 254, 254, right and left head lights 250, 250 and right and left high beam lights 252, 252. In other embodiments, the auxiliary implement 100 can be a vehicle-mounted device that uses or requires auxiliary lighting. Non-limiting examples of other snow and/or ice removal auxiliary implements that may be used with this invention include power brooms, sweepers, spreaders and the like. While the auxiliary implements 100, 100 shown may be mounted to the front of the vehicle, in other embodiments of the invention the auxiliary implement 100 can be mounted to the rear or sides of the associated vehicle, or a combination of the front, rear, and/or sides of the vehicle. For purposes of the remainder of this disclosure, the auxiliary implement 100 will be discussed as a snowplow assembly 102; however, all further embodiments disclosed are intended to be applicable to all embodiments as discussed above—including, where applicable, non-snow and/or ice removal auxiliary implements. As used herein, snowplow assembly 102 is interpreted to include the plow blade 108, the plow frame 110, the lift frame 112, and all parts associated therewith as is well known to those of skill in the art. The trailer hitch 106, when used, can include factory-installed or aftermarket hitches, without limitation.

Figure 2:
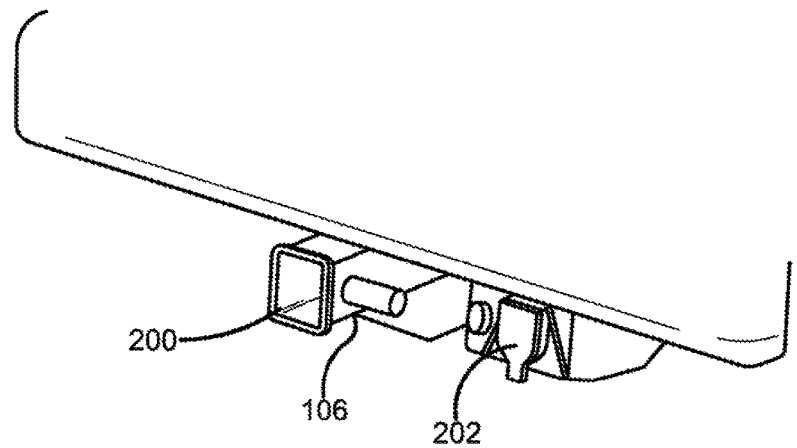
FIG. 2 is a view of an exemplary trailer hitch and trailer plug.
Figure 13:
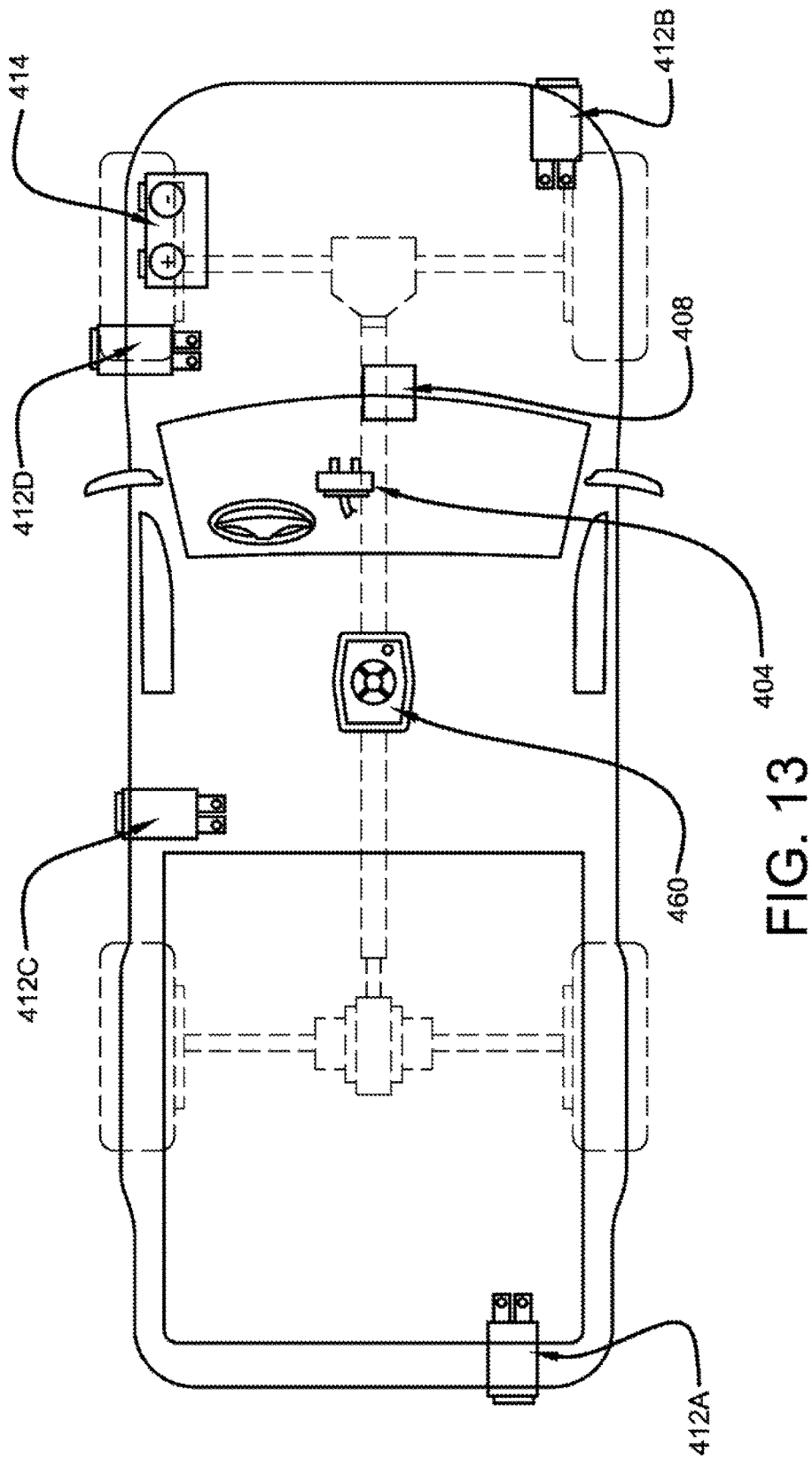
FIG. 13 is a top view of a vehicle in schematic representation showing various components including optional locations for locating an electric plug that is electrically connected to the vehicle's lights according to some embodiments of this invention.

With reference now to FIG. 2, an embodiment of the trailer hitch 106 is shown including a hitch receiver 200 and a trailer plug 202. The hitch receiver 200, as is well known to those of skill in the art, is a tube adapted to receive a portion of a trailer or other device so that the trailer or other device can be physically attached to the vehicle. The trailer plug 202, as is well known to those of skill in the art, is an electric plug. While trailer plugs ordinarily come with hitch receivers, as shown, it should be understood that a hitch receiver is not required for this invention. FIG. 13 is a schematic representation of a vehicle. Reference 412 indicates an electric plug that is electrically connected to the vehicle's light system and the corresponding letter indicates the various possible locations for the electric plug 412. Thus, the electric plug may be positioned at the rear of the vehicle, as is typically known and thus referred to as a "trailer" plug, as is shown with reference 412A. Alternatively, or in addition, an electric plug may be positioned at the front of the vehicle as shown with reference 412B. Yet other alternative or additional embodiments include positioning an electric plug at the side of the vehicle as shown with reference 412C and/or near the vehicle battery 414 as shown with reference 412D. It should be understood that the location of the electric plug when used with this invention can be any location chosen with the sound judgment of a person of skill in the art. FIG. 13 also shows, schematically, an operator adjustable light control 404 (commonly referred to as a "light switch") that permits a user to control the vehicle lights. One or more such operator adjustable light controls may be used to control the vehicle's headlights, taillights, blinker lights, etc. as is well known to those of skill in the art.

Figure 3A:
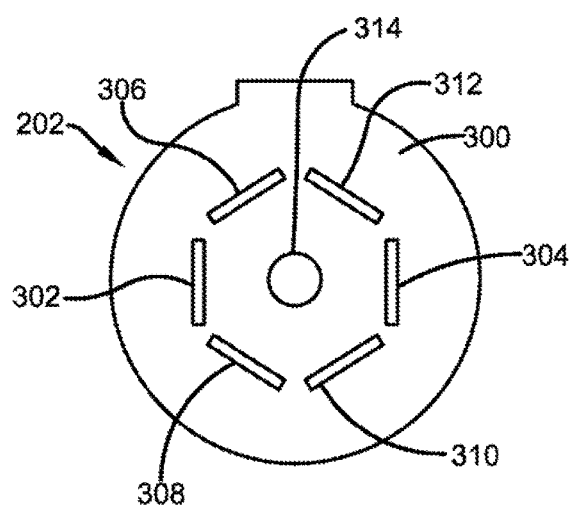
FIG. 3A is a close-up, end view of a 7-way plug.
Figure 3B:
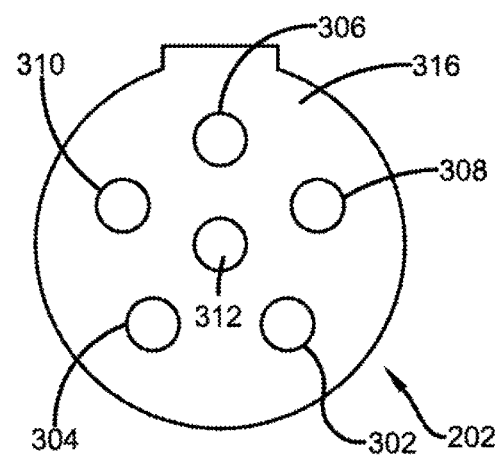
FIG. 3B is a close-up, end view of a 6-way plug.
Figure 3C:
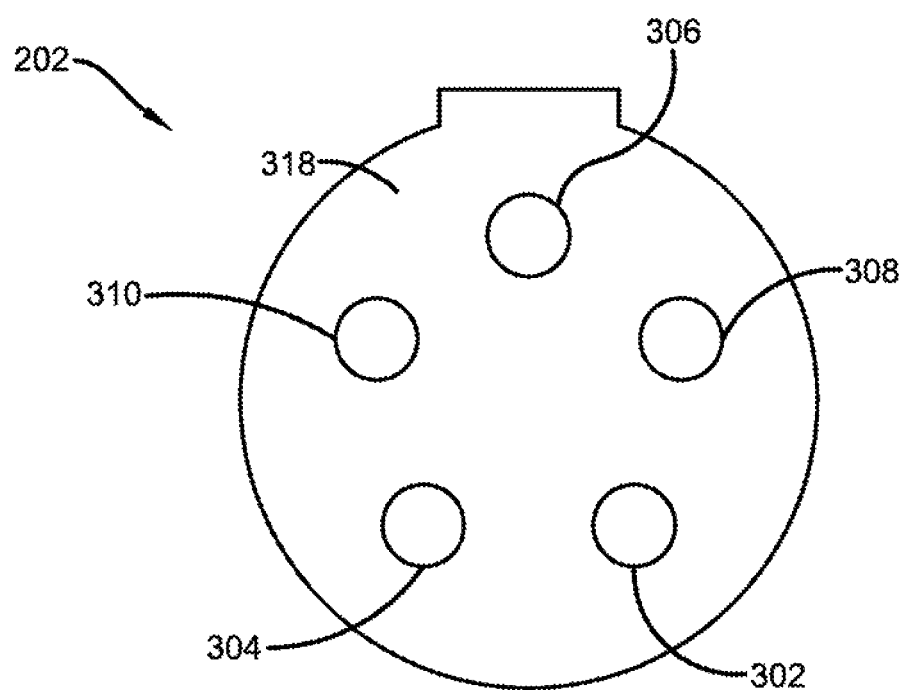
FIG. 3C is a close-up, end view of a 5-way plug.

As noted above, there are several types of electric plugs. FIG. 3A illustrates a 7-way trailer plug; FIG. 3B illustrates a 6-way trailer plug; FIG. 3C illustrates a 5-way trailer plug; and, FIG. 3D illustrates a 4-way trailer plug. This invention may be used with any trailer plug chosen with the sound judgment of a person of skill in the art. The trailer plug 202 can be factory installed on the vehicle or it can be installed by an aftermarket or third party installer, without limitation. The trailer plug 202 can include a cover, as shown, but a cover is not required for this invention.

FIG. 3A illustrates a standard 7-way plug 300 that includes seven electrical connections with each of these connections providing power and/or control over some portion(s) of a trailer (not shown). One known set of connections are: (1) for a left turn signal 302 (also used for braking); (2) for a right turn signal 304 (also used for braking); (3) for tail lights 306 (also for marker lights); (4) a ground wire 308; (5) for trailer power brakes 310; (6) an auxiliary power connection 312; and (7) for reverse lights 314. FIG. 3B illustrates a 6-way plug 316 with these six connections: (1) for a left turn signal 302 (also used for braking); (2) for a right turn signal 304 (also used for braking); (3) for tail lights 306 (also for marker lights); (4) a ground wire 308; (5) for trailer power brakes 310; and, (6) an auxiliary power connection 312. FIG. 3C illustrates a 5-way plug 318 with these five connections: (1) for a left turn signal 302 (also used for braking); (2) for a right turn signal 304 (also used for braking); (3) for tail lights 306 (also for marker lights); (4) a ground wire 308; and, (5) for trailer power brakes 310. FIG. 3D illustrates a 4-way plug 320 with these four connections: (1) for a left turn signal 302 (also used for braking); (2) for a right turn signal 304 (also used for braking); (3) for tail lights 306 (also for marker lights); and, (4) a ground wire 308. It should be understood that the trailer plugs 202 just described are exemplary only as many variations are possible.

Figure 11:
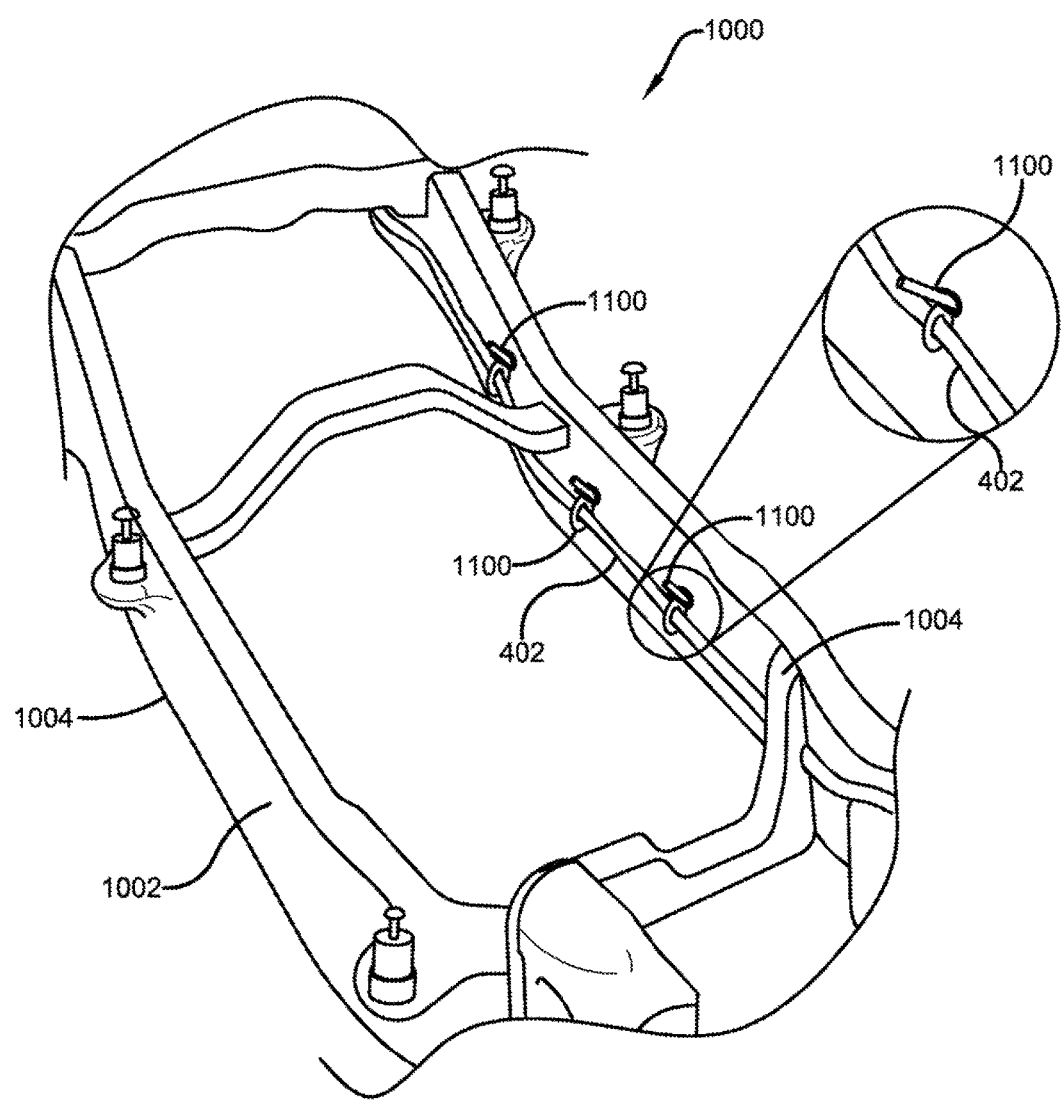
FIG. 11 is a detailed view of a portion of a vehicle chassis showing the wire bundle attachment means.

With reference now to FIG. 11, according to some embodiments of this invention, a wire bundle 402 (also referred to as a wiring harness) is used to connect the trailer plug 202 to the auxiliary lighting system 114. There are several advantages of using such "hard-wired" devices as compared to a wireless device (discussed further below). These advantages include the lack of electrical interference and the lack of control delays both of which are often found in wireless systems.

Figure 4:
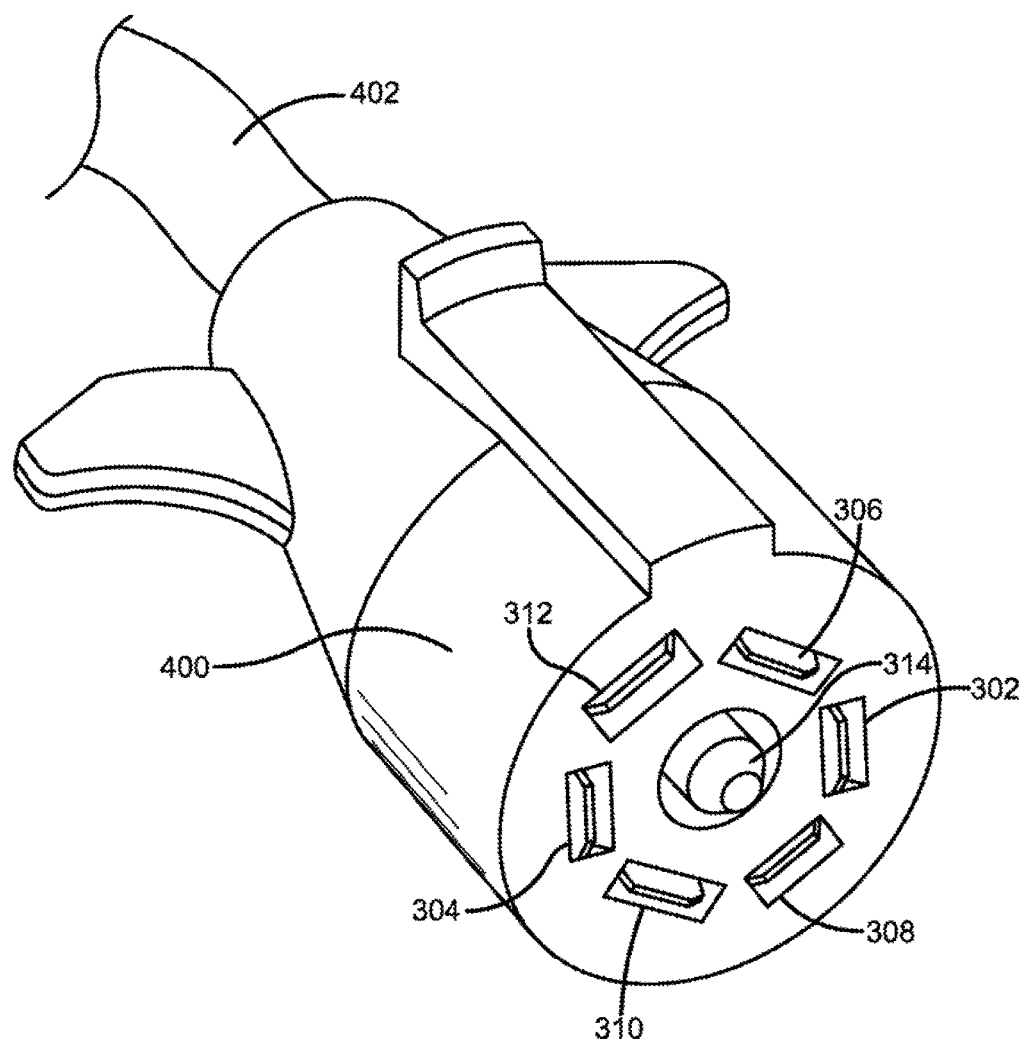
FIG. 4 is a perspective view of an auxiliary plug with the end of a wire bundle visible.
Figure 4A:
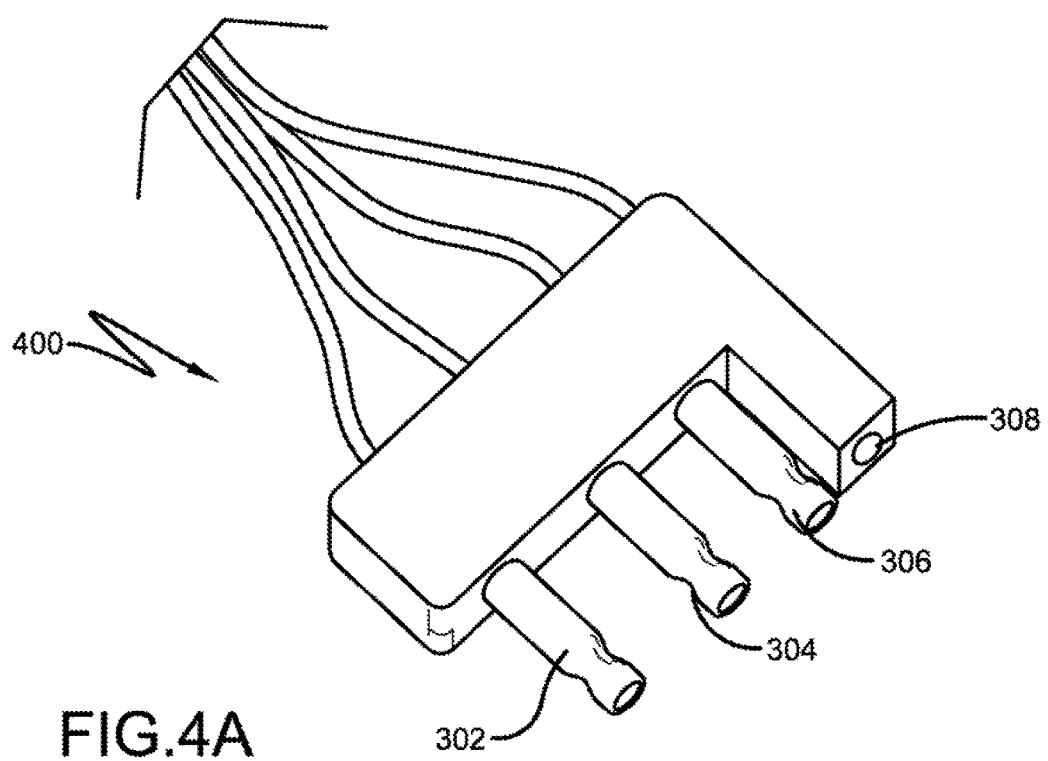
FIG. 4A is a perspective view of another auxiliary plug.

With reference now to FIGS. 4, 4A and 11, one end of the wire bundle 402 may have an auxiliary plug 400 that is suitable to electrically connect to (plug into) the particular trailer plug 202. FIG. 4 shows one embodiment auxiliary plug 400 that is suitable to plug into the 7-way trailer plug 300 shown in FIG. 3A. The same reference numbers are used in FIG. 4 as in FIG. 3A to indicate the correlating interconnections. Thus, for example, the auxiliary plug 400 connections are: (1) 302 to match or connect to connection 302 of the trailer plug 300; (2) 304 to match or connect to connection 304 of the trailer plug 300; (3) 306 to match or connect to connection 306 of the trailer plug 300; (4) 308 to match or connect to connection 308 of the trailer plug 300; (5) 310 to match or connect to connection 310 of the trailer plug 300; (6) 312 to match or connect to connection 312 of the trailer plug 300; and, (7) 314 to match or connect to connection 314 of the trailer plug 300. Similarly, in other embodiments, the auxiliary plug 400 can be formed to electrically connect to (plug into): trailer plug 316 in FIG. 3B; trailer plug 318 in FIG. 3C; and, trailer plug 320 in FIG. 3D. FIG. 4A, for example, shows an auxiliary plug 400 that is formed to electrically connect to (plug into) trailer plug 202 shown in FIG. 3D. The auxiliary plug 400 can be formed to electrically connect to (plug into) any trailer plug chosen with the sound judgment of a person of skill in the art.

Figure 14:
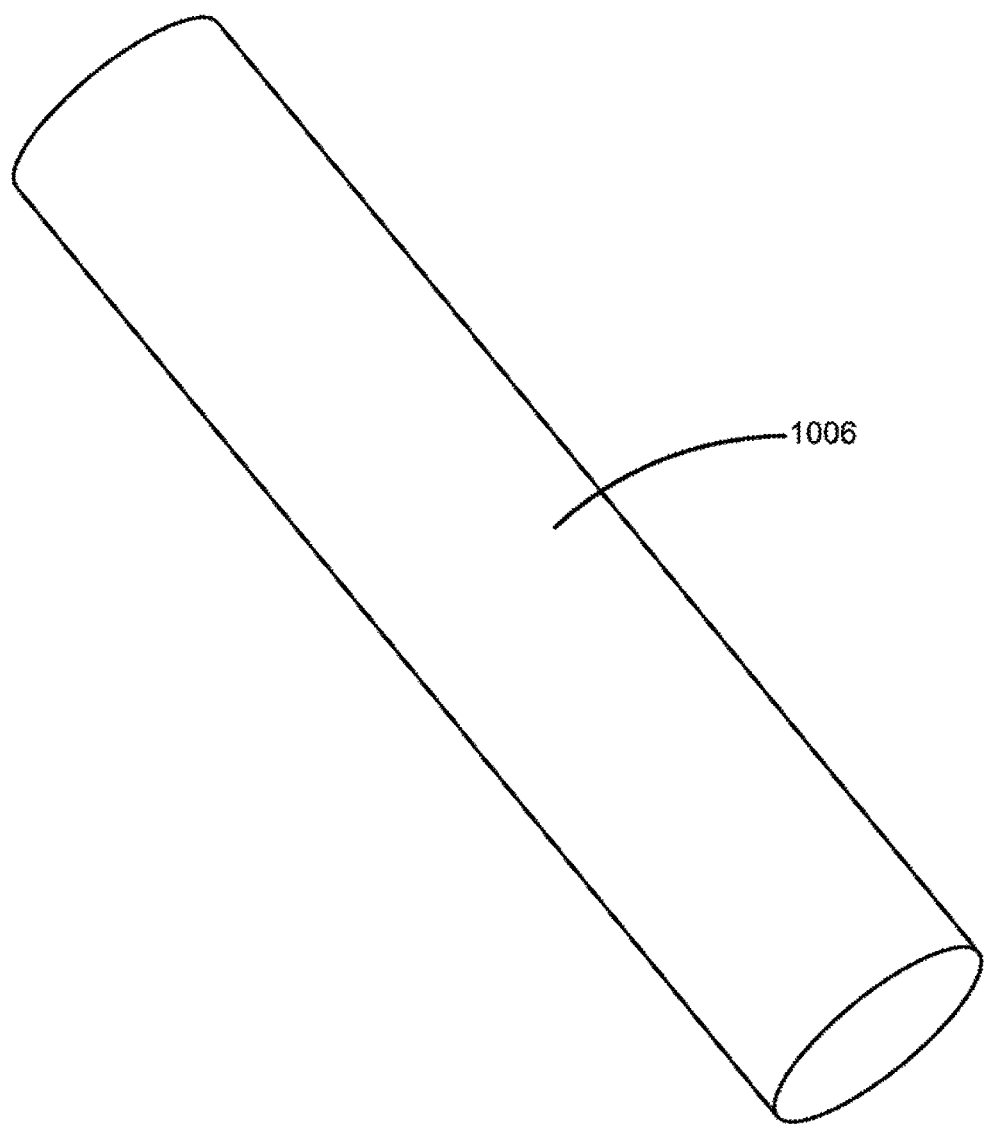
FIG. 14 is a side perspective view of a conduit that may be used to support a wiring harness according to some embodiments of this invention.

With reference now to FIGS. 4, 6 and 10-11, the opposite end of the wire bundle 402 may, in some embodiments, electrically connect to (plug into) a controller 600. Alternatively, the opposite end of the wire bundle 402 may connect to another component(s) that connect to the controller 600. In yet other embodiments, a controller is not required and the wire bundle 402 may be connected directly to the auxiliary lights. The operation of the controller 600 will be discussed further below. The wire bundle 402 may be secured to the vehicle in any manner chosen with the sound judgment of a person of skill in the art. According to one embodiment, the wire bundle 402 is secured under the chassis 1000 of the vehicle and runs lengthwise from the rear of the vehicle to the front of the vehicle where it can terminate at or near the snowplow assembly 102. According to another embodiment, the wire bundle 402 can terminate at the front of the vehicle whereby a second connection could be made with the snowplow assembly 102 wiring system. The wire bundle 402 can be secured to the chassis 1000, such as to the vehicle's frame rail 1004, using zip-ties 1100, twist ties, wires, or any other fastener chosen by the sound judgment of a person of ordinary skill in the art. The wire bundle 402 may be shielded wire such as the hex-wire typically used for electronics. According to another embodiment, shown in FIG. 14, conduit 1006 can be mounted to the chassis 1000, such as to the vehicle's frame rail 1004, using zip-ties 1100, automotive grade tape, or other fasteners. The conduit 1006 could be formed of any material chosen with the sound judgment of a person of skill in the art, such as polyvinyl chloride (PVC). The wire bundle 402 can be routed through the conduit from the rear of the vehicle to the front of the vehicle. According to another embodiment, the wire bundle 402 can be routed through the interior of the vehicle's frame 1002. The wire bundle 402 can be aligned to the driver side or passenger side of the vehicle. In one embodiment, the wiring is on the same side of the vehicle as the vehicle battery.

Figure 5:
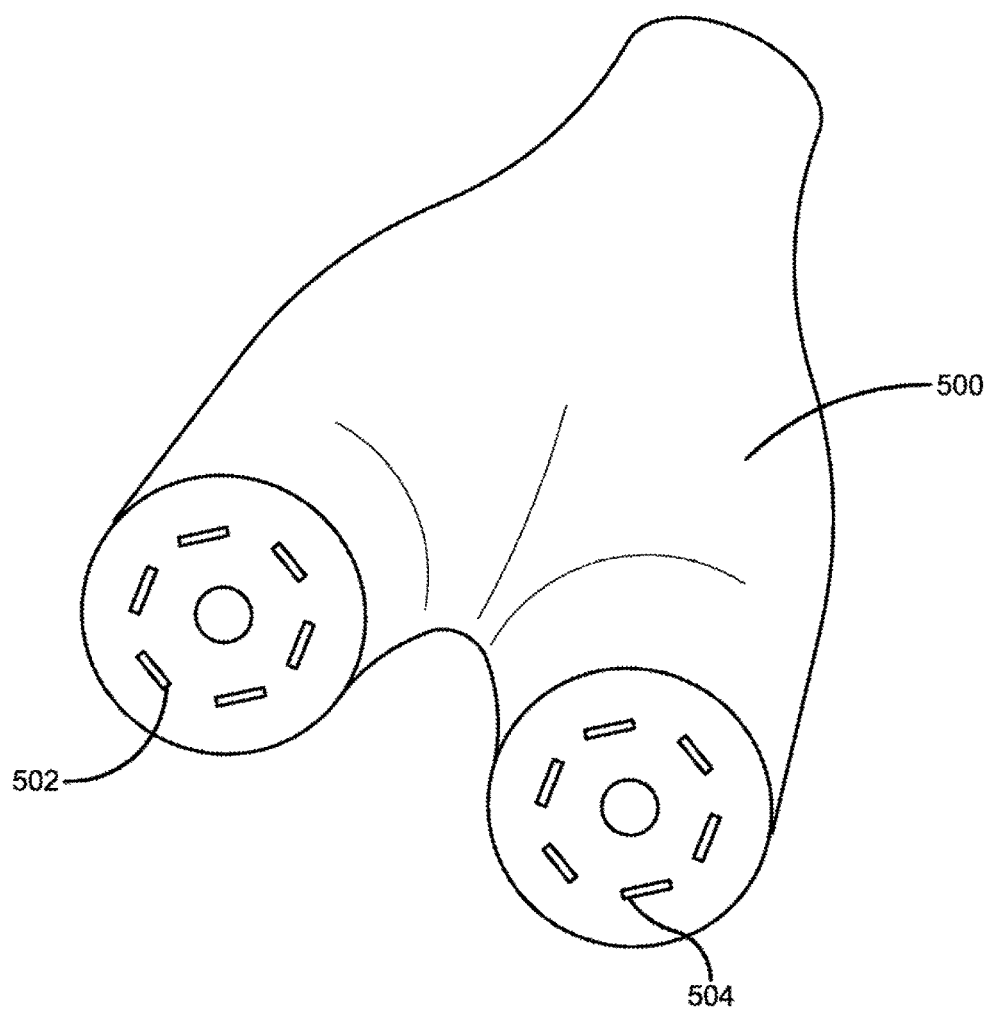
FIG. 5 is perspective view of one embodiment of a pigtail adapter.

With reference to FIG. 5, an adapter 500 can be used between the trailer plug 202 and the auxiliary plug 400. The adapter 500 can split the connections from the trailer plug 200 into a first outlet 502 and a second outlet 504. The first and second outlets 502, 504 can be configured to allow connections for any of the various plug types. By way of a non-limiting example, the first outlet 502 can be a 7-way plug 300 while the second outlet 504 can be a 4-way plug 320. The combinations can be chosen by a person of ordinary skill in the art and can be tailored for specific needs given the desired usage. The adapter 500 can allow a person to connect the present invention while leaving an additional connection available for use with a trailer or second implement 100. According to one embodiment, the adapter 500 can have more than two outlets.

Figure 1B:
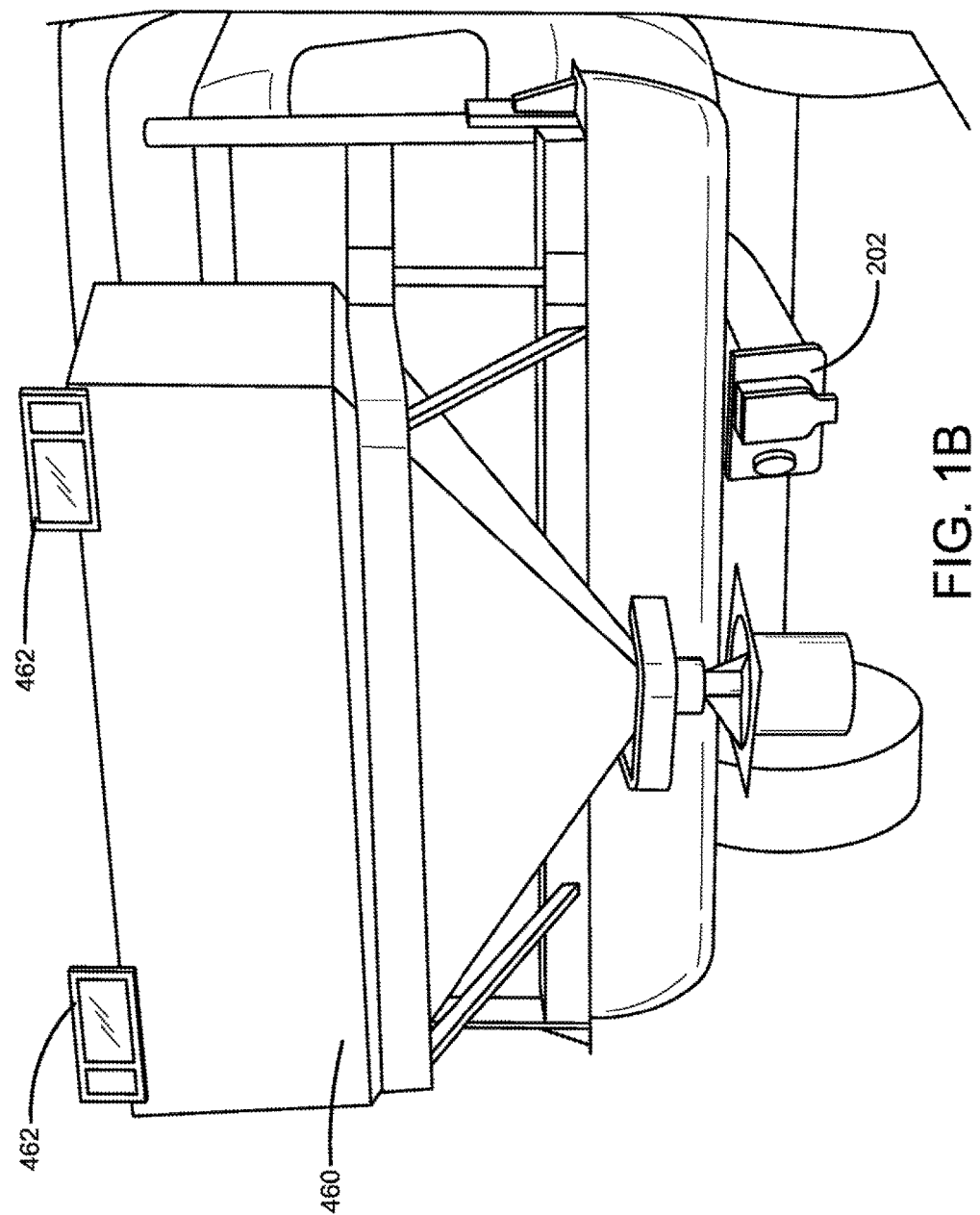
FIG. 1B is a back perspective view of a vehicle with a salt spreader attached thereto.

With reference now to FIGS. 1, 1B, 13, and 15-17, in one embodiment three wire bundles or wiring harnesses may be used to electrically engage with the vehicle's electric plug (including but not limited to a trailer plug) that is electrically connected to the vehicle lights in order to operate an auxiliary lighting system. A user operable device 406 may be designed to operate at least one function of the auxiliary snow and/or ice removal implement 100. In one non-limiting example, the user operable device 406 may be a handheld controller which is maintained within the vehicle so that the vehicle's driver can also operate the implement 100. Such a device 406 may be used, for example, to operate functions such as to raise and lower the snow plow and/or turn a salt spreader system on and off. FIG. 1B, for example, shows a spreader 460 including auxiliary lights 462 that may be use the wiring harnesses to be described along with trailer plug 202 (or an alternate electric plug). In some embodiments, a sensor 408 may be operable to turn off the auxiliary light 104 when the vehicle lights are turned off. The operation of sensor 408 may be in any manner chosen with the sound judgment of a person of skill in the art. In one embodiment, the sensor 408 works with a microprocessor described elsewhere in this patent. In another embodiment the sensor 408 works with a relay in a known manner.

Figure 15:
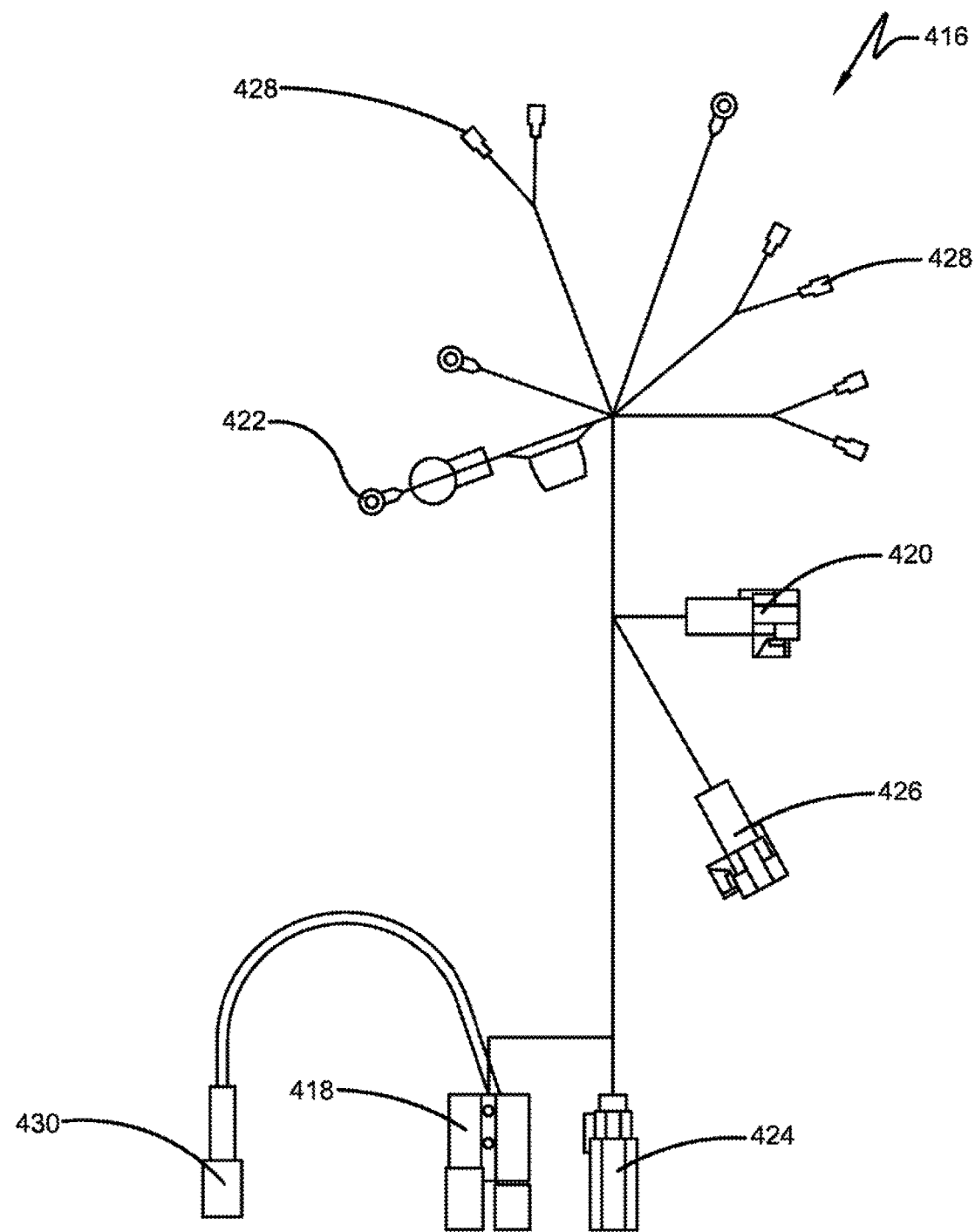
FIG. 15 is a schematic representation of a wiring harness according to some embodiments of this invention.
Figure 16:
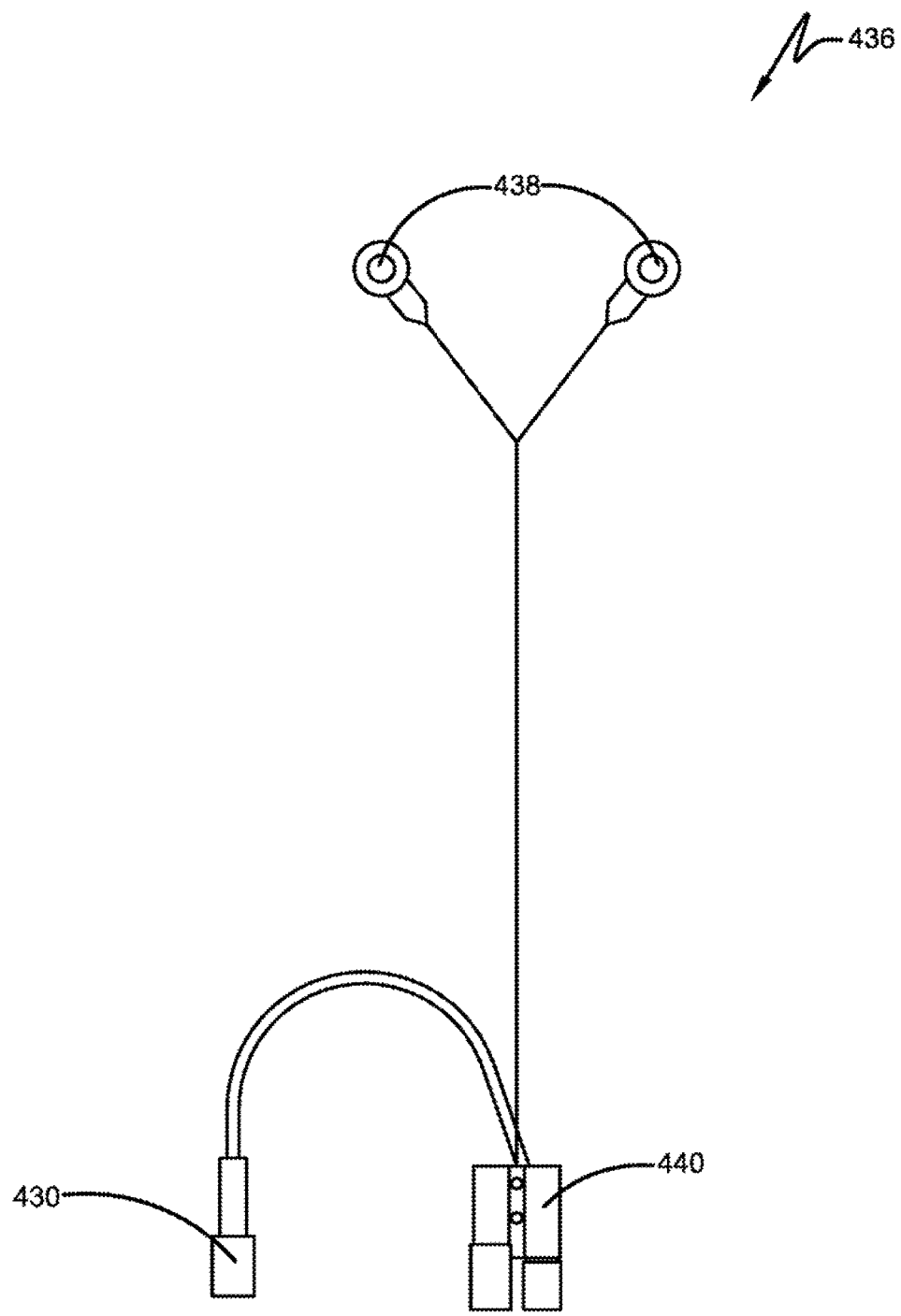
FIG. 16 is a schematic representation of a wiring harness according to other embodiments of this invention.
Figure 17:
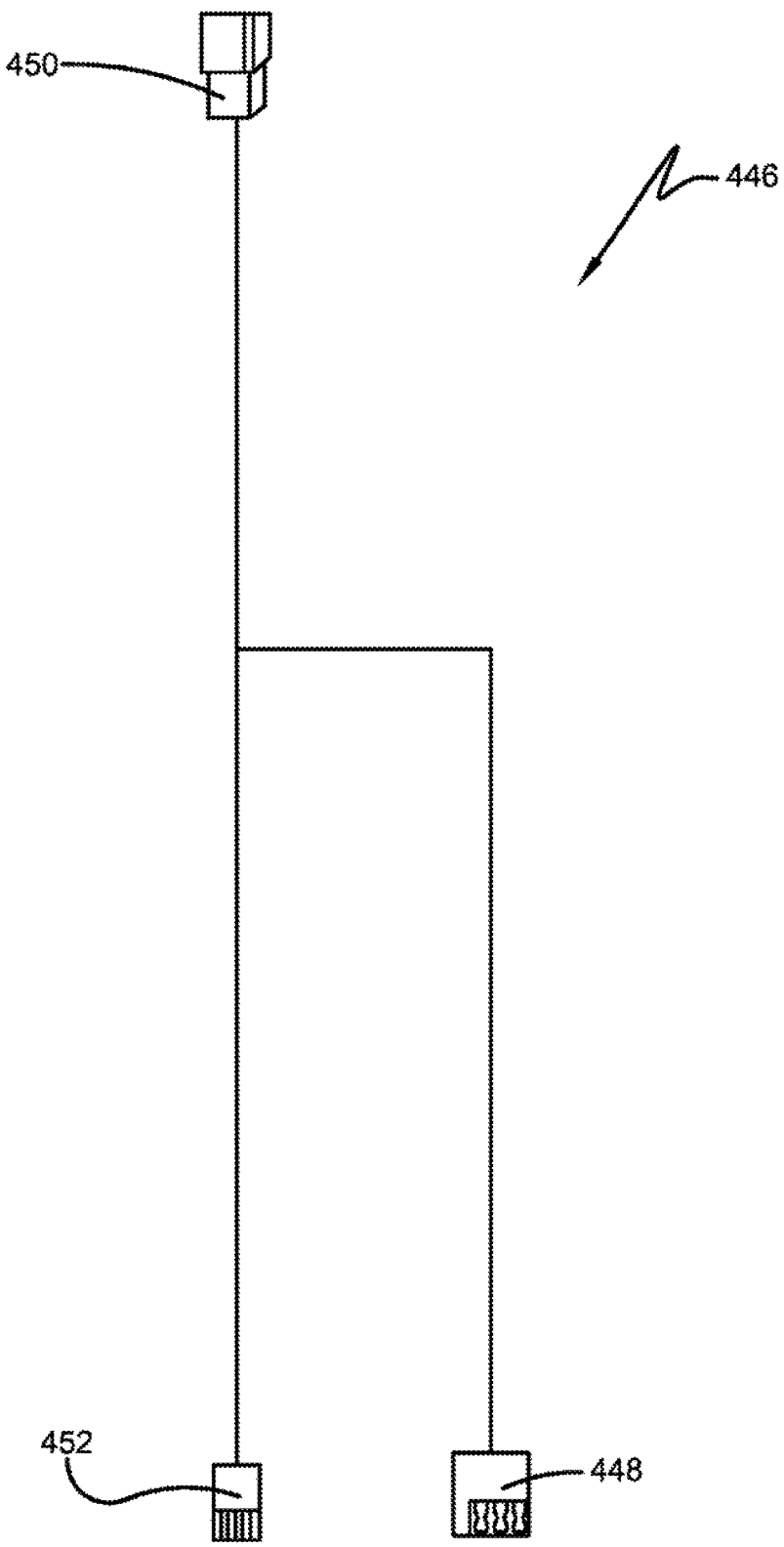
FIG. 17 is a schematic representation of a wiring harness according to yet other embodiments of this invention.

A first wiring harness 416, shown in FIG. 15, may include: a first electrical connector 418 that may be a power connector; a second electrical connector 420 that may be electrically connectable to at least one of the auxiliary lights 104; a third electrical connector 422 that may be electrically hardwire connectable to the auxiliary implement 100; and, a fourth electrical connector 424. It should be noted, however, that additional electrical connectors may also be part of the first wiring harness 416. Thus, for example, the first wiring harness 416 may also include a fifth electrical connector 426 that may be electrically connectable to at least one of the auxiliary lights 104. In one embodiment, there is an electrical connector for each of the auxiliary lights that must be illuminated. The first wiring harness 416 may also include additional electrical connectors 428 used to connect to various components of the auxiliary implement 100. Any number of electrical connectors chosen with the sound judgment of a person of skill in the art, may be included with the first wiring harness 416. If desired, a connector cap may be secured to the wiring harness 416 near any electrical connector that can use such a cap to protect the connector when not in use. Electrical connector 418, for example, has a connector cap 430.

With reference now to FIGS. 1, 13, and 15-16, a second wiring harness 436 may include: a first end that is electrically connectable to the vehicle battery (a pair of battery loops 438, one to receive the negative battery terminal and the other to receive the positive battery terminal, may be used for this purpose); and, a second end with a power connector 440. The power connector 440 may be electrically hardwire connectable to the power connector 418 of the first wiring harness 416 and may be designed to transmit power from the vehicle battery 414 to the power connector 418 of the first wiring harness to power the auxiliary implement 100. The power connector 440 may include an electric connector cap 430, as shown.

With reference now to FIGS. 1, 13, 15, and 17, a third wiring harness 446 may include: a first connector 448 (such as previously described auxiliary plug 400 shown in FIG. 4A) that is electrically hardwire connectable to the vehicle electric plug 412; a second connector 450 that is electrically hardwire connectable to the fourth electrical connector 424 of the first wiring harness 416; and, a third connector 452 that is designed to be connected to the user operable device 406. The third wiring harness 446 may be designed to transmit an electrical signal from the vehicle electric plug 412 to the first wiring harness 416 and then to the operator adjustable light control 404.

With reference now to FIGS. 1, 13, 15-17, when the first, second, and third wiring harnesses 416, 436, 446 are connected as just described: the user operable device 406 is operable to operate at least one function of the auxiliary snow and/or ice removal implement 100; and, the operator adjustable light control 404 is operable to control the at least one auxiliary light 104.

With reference now to FIGS. 1, 5, 13, and 15-17, the wiring harnesses 416, 436, 446 may be secured to the implement 100, the vehicle, or some combination of both the implement 100 and the vehicle. In one non-limiting embodiment, the first wiring harness 416 is primarily or entirely supported to the implement 100 and thus is considered an "implement-sided" wiring harness. Both the second and third wiring harnesses 436 and 446 may be primarily or entirely supported to the vehicle and thus considered "vehicle-sided" harnesses. The wiring harness 416 may connect directly to the auxiliary headlight(s) 104 or, alternatively, may connect to a microprocessor which operates as described below. The wiring harness 446 may connect directly to the electric plug 412 or, alternatively, may connect to an adapter 500 as described above.

With reference now to FIGS. 1, 1B, 10-11, 13, and, 15-17, the wiring harnesses 416, 436, 446 may be used as follows after the implement 100 has been mounted to the vehicle and the auxiliary lighting system 114 has been mounted to the vehicle and/or to the implement 100. The wiring harnesses 416, 436, 446 may be secured to the auxiliary snow and/or ice removal implement 100 and/or to the vehicle. The second electrical connector 420 of the first wiring harness 416 may be electrically connected to the auxiliary light(s) 104 (either directly or via a microprocessor). The third electrical connector 422 of the first wiring harness 416 may be electrically hardwire connected to the auxiliary implement 100. The first end of the second wiring harness 436 (using, in one embodiment, battery loops 438) may be electrically connected to the vehicle battery 414. The power connector 440 of the second wiring harness 446 may be electrically hardwire connected to the power connector 418 of the first wiring harness 416 to enable power to be transmitted from the vehicle battery 414 to the auxiliary snow and/or ice removal implement 100.

With reference now to FIGURES now to FIGS. 1, 1B, 13, and, 15-17, the first connector 448 of the third wiring harness 446 may be electrically hardwire connected to the vehicle electric plug 412. The position of the electric plug 412 on the vehicle will determine the required length for the third wiring harness 446. The second connector 450 of the third wiring harness 446 may be electrically hardwire connected to the fourth electrical connector 424 of the first wiring harness 416. The third connector 452 of the third wiring harness 446 may be electrically hardwire connected to the user operable device 406 to enable an electric signal to be transmitted from the vehicle electric plug 412 to the first wiring harness 416. Once the wiring harnesses 416, 436 and 446 are properly connected, the user operable device 406 may be manually operated to operate at least one function of the implement 100 and the operator adjustable light control 404 may be manually operated to control the auxiliary light(s) 104.

With reference now to FIGS. 1, 5, 13, and, 15-17, if a controller having a microprocessor is used, the second electrical connector 420 of the first wiring harness 416 may be electrically connected to the microprocessor. The microprocessor may be programmed to operate the auxiliary light(s) 104 based on the electric signal. If an adapter 500 is used, the first connector 448 of the third wiring harness 446 may be electrically connected to a first outlet of the adapter 500 enabling the second outlet of the adapter to be used to attach to another component. Such a component can be of any type chosen with the sound judgment of a person with skill in the art such as, for example, a skid steer positioned on a trailer being pulled by the vehicle.

Figure 12:
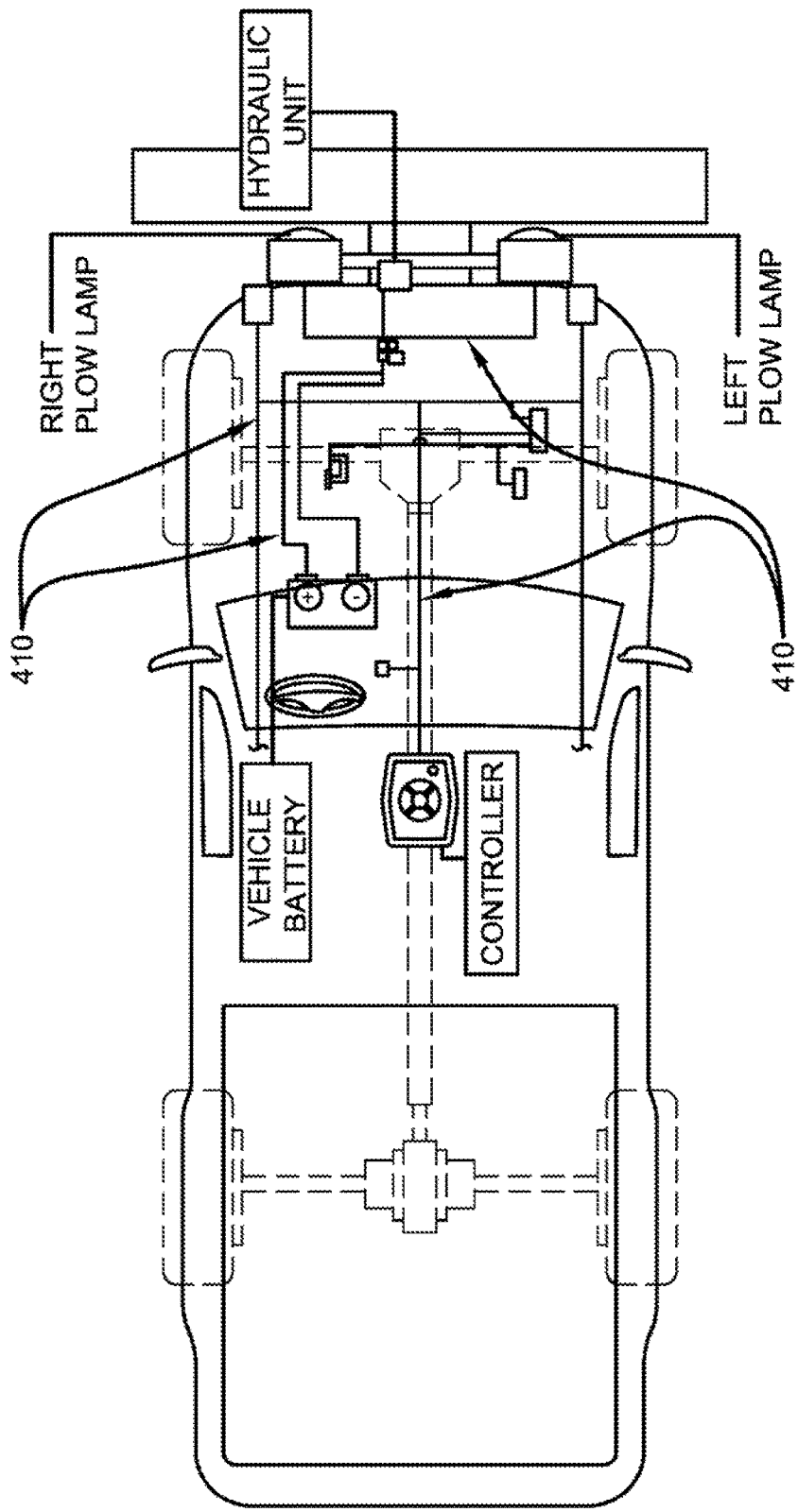
FIG. 12 is a top view of a vehicle in schematic representation showing the complexity of known wiring systems required to install a snowplow.
Figure 18:
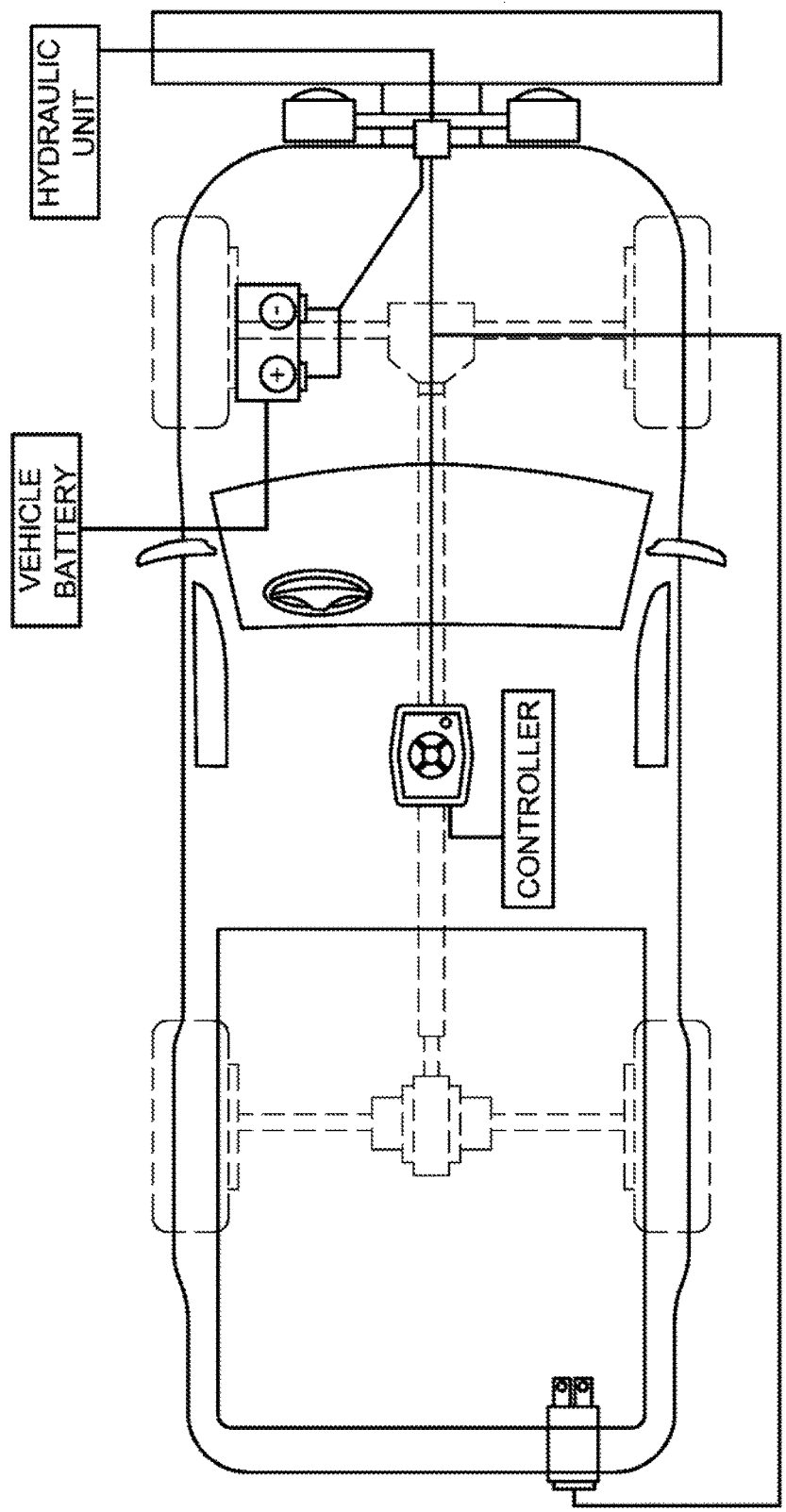
FIG. 18 is a top view of a vehicle in schematic representation showing embodiments of this invention.

There are numerous advantages to the apparatuses and methods just described. One advantage is that all the steps are safely accomplished without the aid of an electrical technician. This is because no splicing or cutting of any wiring is required. Thus, none of the vehicle's electrical system, in function or in structure, is altered in any way. The headlights, for example, do not have to be detached. Also, there is no required reset or adjustments to the vehicle's computer. Another advantage, is that the various electrical connectors provide for easy "plug-and-play" connections. Thus, the time required to install this invention is greatly reduced over known systems. FIG. 18, especially when compared with FIG. 12, shows how greatly simplified the use of this invention is.

Figure 19:
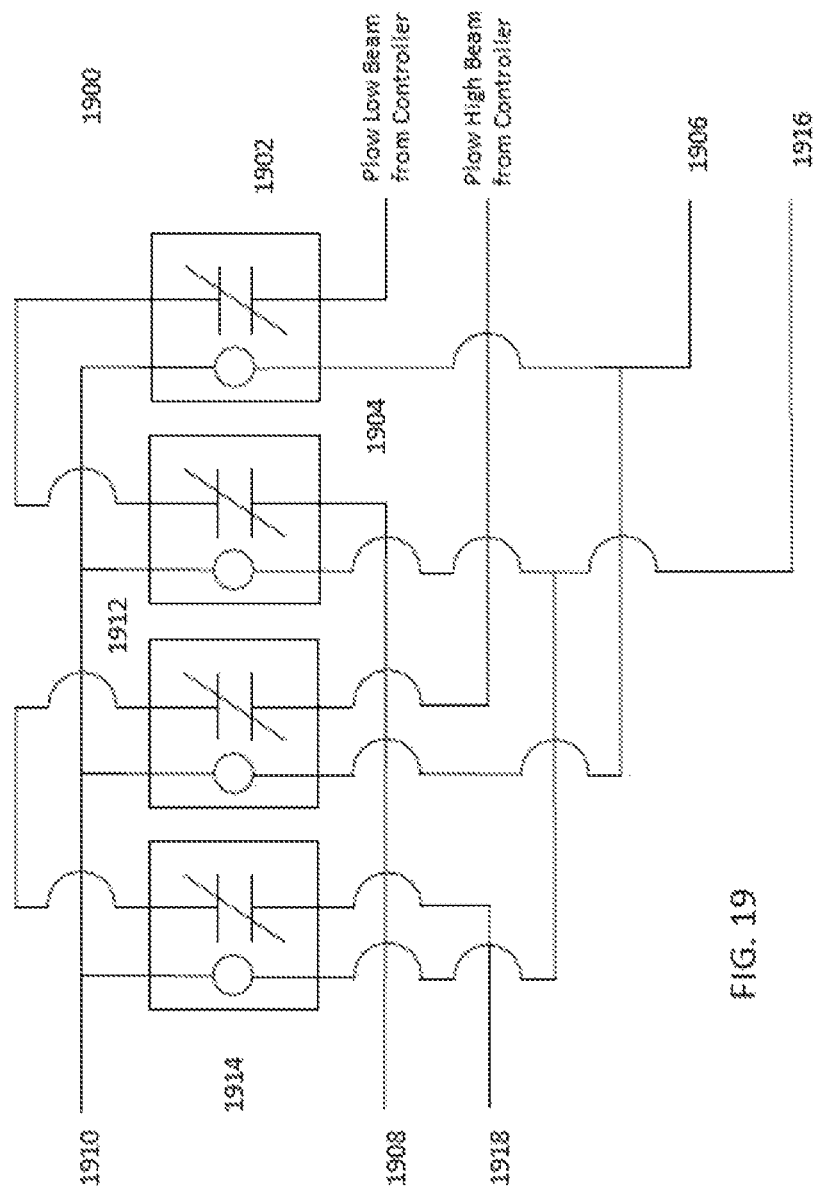
FIG. 19 is a schematic representation of a relay pack according to another embodiment of this invention.

In other applications, by way of a non-limiting example in order to comply with vehicle operating regulations in some jurisdictions, additional embodiments may include minor splicing or tying of wires into the vehicle's existing electrical system. With reference now to FIG. 19, a relay pack 1900 can be tied into the vehicle's electrical system. A first relay 1902 and second relay 1904 can connect to the vehicle low beam via a wire tie 1906, to a plow light low beam 1908, to a plow controller 600, and a ground wire 1910. A third relay 1912 and fourth relay 1914 can likewise connect to the vehicle high beam via wire tie 1916, to the plow light high beam 1918, and to the plow controller 600 and ground wire 1910.

With continued reference to FIG. 19, the first through fourth relays 1902, 1904, 1912 and 1914 respectively of the relay pack 1900 are in a normally closed position wherein both the low beam and high beam circuit of the auxiliary lighting system 114 of the snowplow assembly 102 are interrupted when either the low beam or high beam of the vehicle's headlights are turned on. This normally closed condition of the relay pack 1900 prevents the simultaneous operation of the vehicle's headlight system and the auxiliary lighting system 114, as is required by vehicle operating laws in some jurisdictions. Turning off the vehicle's headlight system, or alternatively, powering the running lights of the vehicle, but not the low or high beams allows power to be supplied to the auxiliary lighting system 114. The auxiliary light low and/or high beams can then be powered via the plow controller 600. If the vehicle headlights are turned on while the auxiliary lighting system 114 is powered and the auxiliary lights 114 are illuminated, the relay pack 1900 will go to the open position, thereby interrupting power to the auxiliary lighting system 114 and powering off the auxiliary lights.

With continued reference to FIG. 19, in embodiments without a controller 600, the auxiliary lighting system 114 can include sensors or other means by which the lights can be illuminated when the vehicle's headlights are not in operation. By way of one non-limiting example, a sensor can be used to detect when the relay pack 1900 is closed, i.e. the vehicle's headlights are not illuminated, along with a sensor to detect ambient light levels. When the relay pack is closed 1900 and ambient light levels fall below a certain threshold, the auxiliary lighting system 114 can illuminate. By way of a second non-limiting example, the auxiliary lighting system 114 can have an "always on" condition wherein when the relay pack 1900 is closed, the auxiliary lights are illuminated. Other such sensors and conditions can be determined by a person of skill in the art.

With reference now to FIGS. 2, 3A, 3B, 3C, 3D, 8 and 8A, in other embodiments of this invention, instead of a wire bundle or wiring harness, a transponder 800 may be electrically connected to and physically supported to the trailer plug 202. In one specific embodiment, the transponder 800 can include a transponder plug 802 which plugs into the trailer plug. The specific transponder plug 802 used may be configured to connect to the particular trailer plug 202 type mounted to the vehicle. According to one embodiment, the transponder plug 802 can be configured to align with the 7-way plug 300. According to other embodiments, the transponder plug 802 can be configured to connect to a 6-way plug 316, a 5-way plug 318, or a 4-way plug 320.

Figure 8:
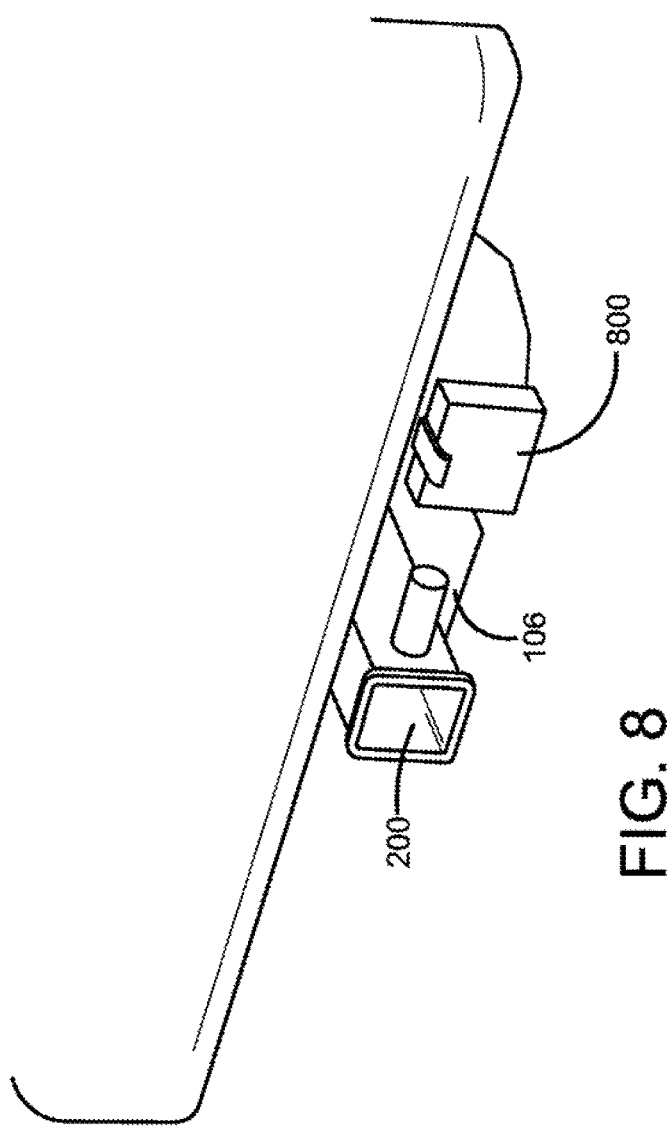
FIG. 8 is a perspective view of the rear of a vehicle, showing a transponder connected to a trailer plug.
Figure 8A:
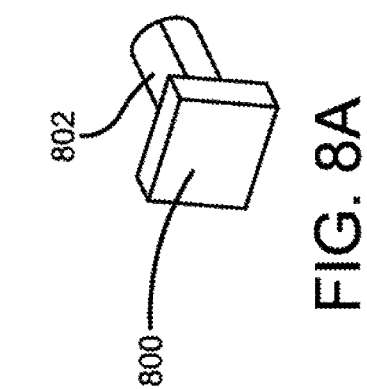
FIG. 8A is a perspective view of a transponder.
Figure 9:
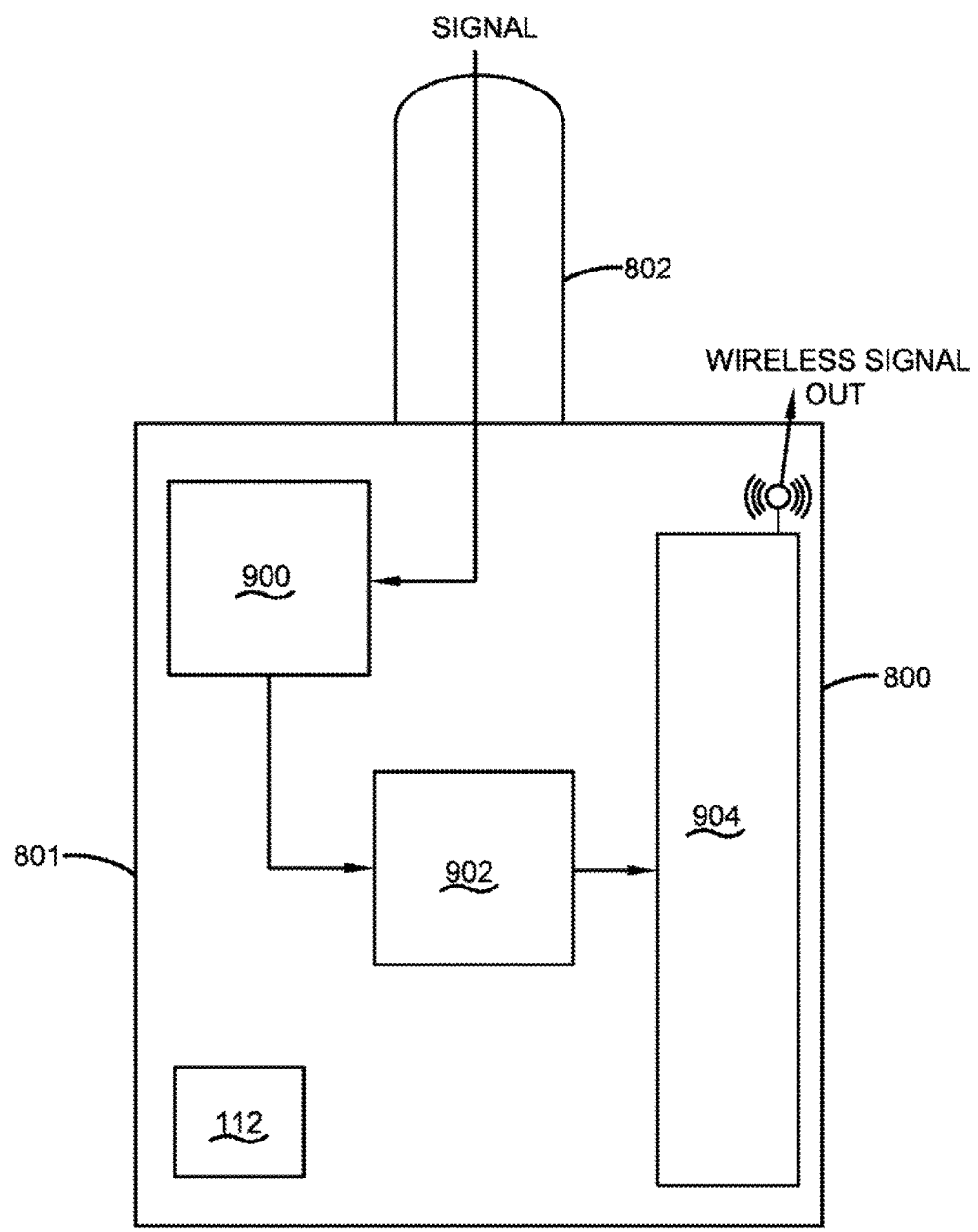
FIG. 9 is a schematic representation of the transponder.
Figure 10:
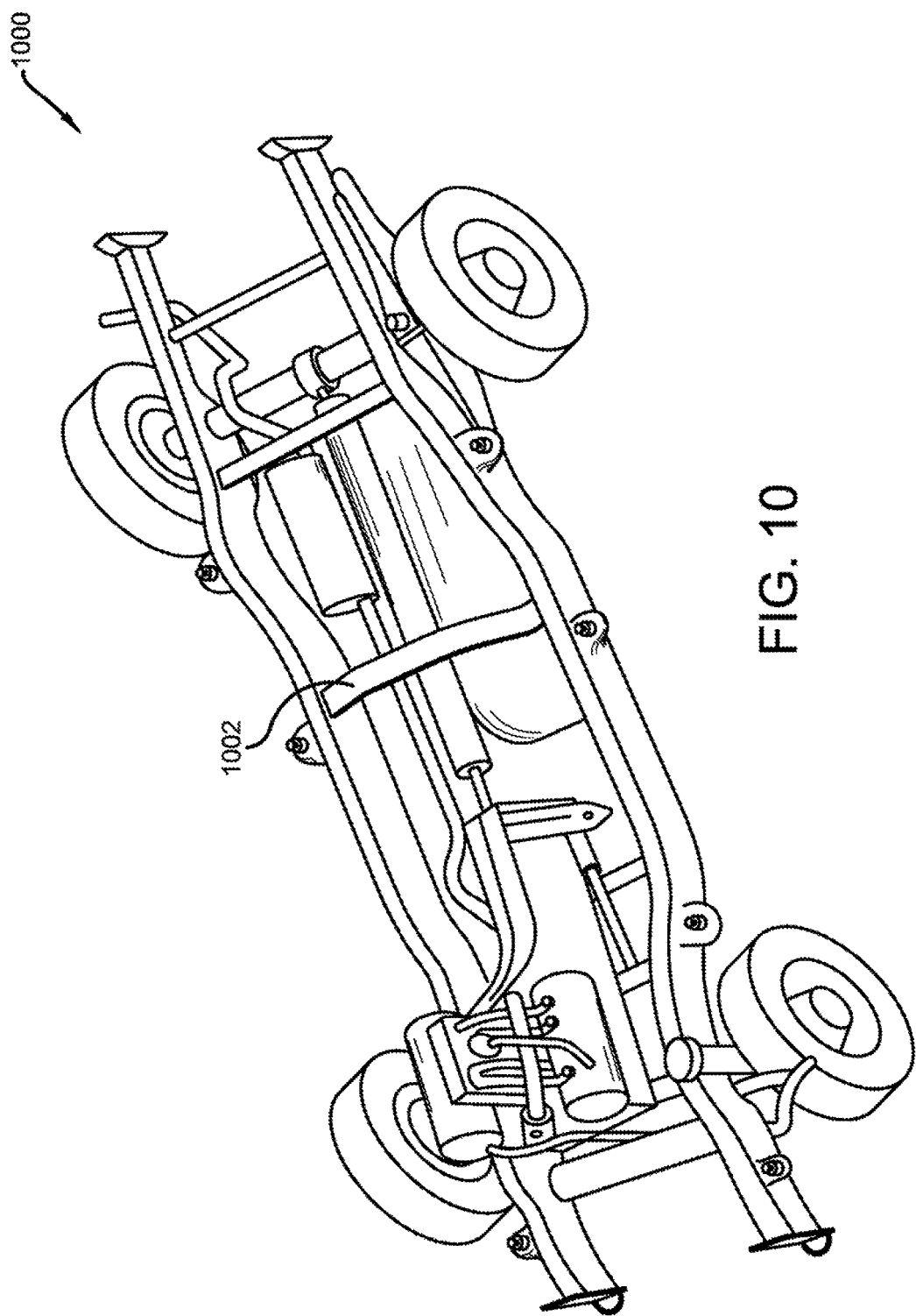
FIG. 10 is a perspective view of an embodiment of a vehicle chassis with the vehicle body removed.

With reference now to FIGS. 2, 8A and 9, in some embodiments, the transponder 800 can include a housing 801 to which the transponder plug 802 is supported. The transponder 800 can also include several circuits that can perform one or more functions. The transponder 800 can, for example, include a receiving unit 900 which is supported to the housing 801 and which receives incoming signals from the vehicle via the trailer plug 202. The receiver then directs the signal to the processing unit 902 which is also supported to the housing 801. The processing unit 902 can interpret the signal it receives to determine the appropriate signal it should send to the communication unit 904. The communication unit 904 may also be supported to the housing 801 and may transmit a corresponding wireless signal. The wireless signal can be radio frequency, WiFi, Bluetooth, or any other wireless transmission protocol capable of being broadcast over a wide enough distance to reliably reach the desired end point to control and/or power the auxiliary lighting system 114. In one embodiment, the transponder 800 can draw power directly from the vehicle's power supply via the trailer plug 202, such as auxiliary power connection 312. In another embodiment, the transponder 800 may be powered directly by an independent power source 212 such as a battery which may be supported to the housing 801. According to an embodiment, the transponder 800 can be mounted to and supported by the hitch receiver 200. According to another embodiment, the transponder 800 can be mounted on and supported to the vehicle. In some embodiments the transponder 800 cannot transfer power to the auxiliary light system 114 so another source of power may need to be supplied to the auxiliary light system 114. In one embodiment, the auxiliary light system 114 is powered by the vehicle's battery 12. In this case, appropriate wiring will have to be provided between the battery 12 and the auxiliary light system 114. In another embodiment, the auxiliary light system 114 may be powered by a separate power source 450 (which may be a battery) that is part of the auxiliary implement 100.

With reference now to FIGS. 1, 1A, 6 and 7, the auxiliary lighting system 114 may include a controller 600 that uses a microprocessor. Controller 600 may, in one embodiment, be a controller that controls not only the auxiliary lighting system 114, but also one or more other portions of the auxiliary implement 100. In another embodiment, the controller 600 may control only the auxiliary lighting system 114. Controller 600 may be mounted on the snowplow assembly 102. According to alternative embodiments, the controller 600 can be mounted within the housing of an auxiliary light 104, or on the vehicle, or within the engine compartment of the vehicle.

Figure 6:
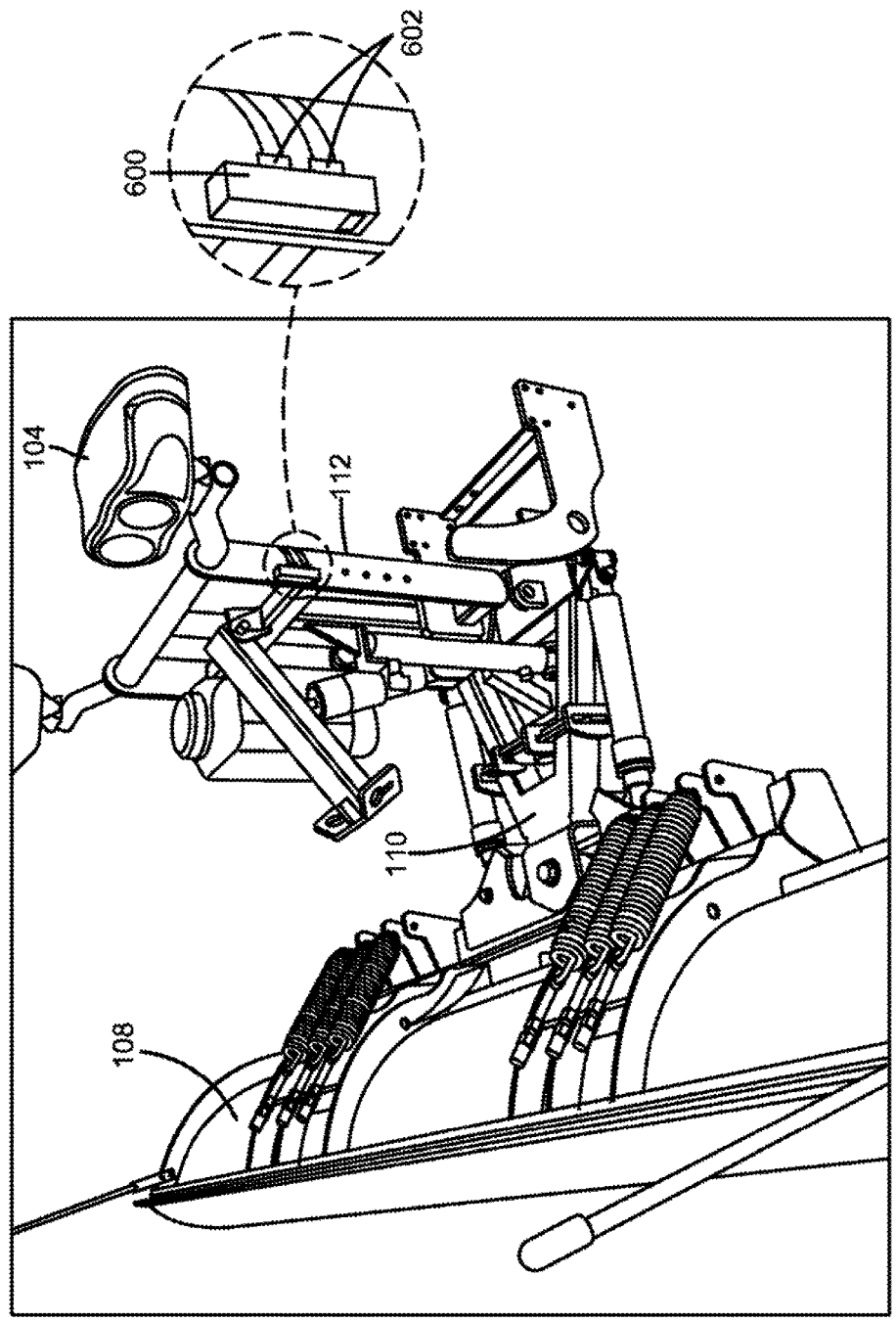
FIG. 6 is a perspective view of a plow frame with a controller.
Figure 7:
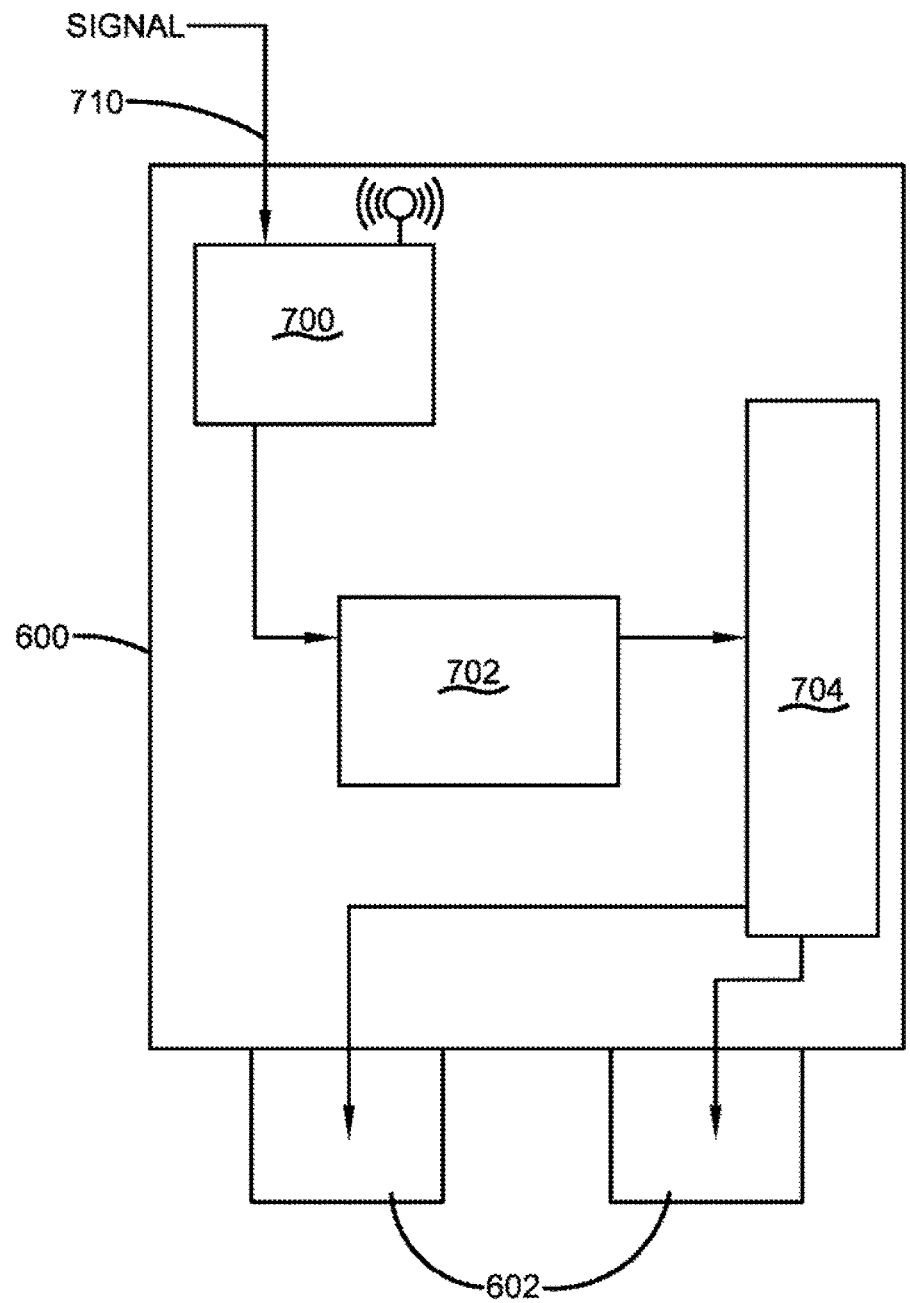
FIG. 7 is a schematic representation of a controller.

With continuing reference to FIGS. 6 and 7, the controller 600 may include several circuits that can perform one or more functions. The controller 600 may include a receiver 700 which receives incoming signals 710. In one embodiment, the signals 710 are sent by wires such as from the wire bundle 402. In another embodiment, the incoming signals 710 a sent wirelessly (through radio frequency, WiFi, Bluetooth, or any other wireless transmission protocol) such as by the transponder 800. The receiver 700 then directs a corresponding signal to the microprocessor 702 which may be programmed to provide appropriate output(s) that may be directed to a power distribution circuit 704 which then sends the appropriate signals to the auxiliary lighting system 114. In one embodiment, the controller 600 may have one or more ports 602 to connect to the auxiliary lighting system 114.

With reference now to FIGS. 1, 1A and 7, some non-limiting embodiments of how the microprocessor 702 may be programmed to be used with the auxiliary lighting system 114 will now be described. If the trailer plug 202 includes a connection 308 for ground, this signal could be used for grounding purposes as is well known to those of skill in the art. The connections 302 and 304 for left and right turn signals can be used to control left and right turn signal lights on the auxiliary lighting system 114 similar to such lights that might be on a trailer and on the vehicle. If the trailer plug 202 includes a connection 312 for auxiliary power, this connection could be used to power any component in any manner chosen by a person of skill in the art. Such a component may be an auxiliary lighting system 114 component and/or an auxiliary implement 100 component. Any trailer plug connection that is not desired to be used can be repurposed or terminated, as determined by one of ordinary skill in the art. The connection 310 for trailer power brakes, for example, could be terminated.

With reference now to FIGS. 1, 1A, 7, and 19, the microprocessor 702 can be programmed to be used with the relay pack 1900 to automatically power and illuminate the auxiliary lighting system 114 when the relay pack 1900 is closed. According to another embodiment, the controller 600 can include controls for the auxiliary low and high beams which can be operated by a user according to that user's discretion.

With reference now to FIGS. 1, 1A and 7, the connections 302 and 304 can also be used for indicating that the vehicle operator has activated the vehicle brakes as noted above. The connection 310 could also be used for this purpose. This braking signal could be used with the auxiliary lighting system 114 is a number of different ways. In one embodiment, one or more lights on the auxiliary lighting system 114 could be illuminated continuously for the duration of the braking event. In another embodiment, left and right turn signal lights on the auxiliary lighting system 114 could be controlled to flash on and off for the duration of the braking event. These embodiments may be used indicate to observers in front of the vehicle that the vehicle is slowing and/or that they should exercise caution. The brake signal could also, in some embodiments, be used with respect to the auxiliary implement 100. In one non-limiting example, the brake signal could be used to adjust the position of the snowplow assembly 102. The connection 314 for reverse lights could also be used to illuminate lights on the auxiliary lighting system 114 or could be terminated.

With reference now to FIGS. 1, 1A and 7, the trailer plug connections can also be used to control auxiliary headlights in any manner chosen with the sound judgment of a person of skill in the art. In one non-limiting example, it is common for vehicle light controls to be adjustable between: (1) an "off" or no power condition; (2) park or running lights "on" condition; (3) headlights "on" condition; and, (4) headlight high beams "on" condition. When the vehicle lights are in the off condition, no power goes to the vehicle head lights or high beams or to the vehicle's tail lights. In this case, connection 306 for tail lights would not be powered and the microprocessor 702 may be programmed to use this signal as an indication to provide no power to the auxiliary headlights—thus an "off" condition for the auxiliary headlights to match the vehicle headlights. When the vehicle lights are in any of the on conditions (whether park or running lights on, or headlights on, or high beams on), connection 306 for tail lights would be powered (an "on" condition) and the microprocessor 702 may be programmed to use this signal as an indication to provide power to the auxiliary headlights—thus an "on" condition for the auxiliary headlights. Whenever the auxiliary lighting system 114 is attached to the vehicle, the vehicle operator may treat all "headlight on" conditions (conditions 2, 3 and 4 discussed above) the same; namely, manually adjusting the vehicle light controls to be in the park or running lights "on" condition. In this way, neither the vehicle headlights nor the vehicle high beams will be "on" and thus will not reflect off of the auxiliary implement 100 back to the vehicle thereby interfering with the operator's vision.

With reference now to FIG. 1, in some embodiments a signal is communicated from the trailer plug 202 through the wire bundle 402 and eventually to the microprocessor 702. In other embodiments described above, a signal is communicated from the trailer plug 202 through the transponder 800 then wirelessly from the transponder and eventually to the microprocessor 702. As is well known to those of skill in the art, a microprocessor operates based on the signal it receives from an input. As explained above, the signal that reaches the microprocessor 702 may come from a component intermediate the signal from the wire bundle 402 or transponder 800—such as from the receiver 700. Additional and/or alternative intermediate components may also be used in other embodiments. For clarity, the expression "directly or indirectly" may be used in this patent with regard to signals (whether wired or wireless). It is to be understood that "directly" means a signal that travels directly from one component to a second component and "indirectly" means a signal that travels from one component to a second component but with one or more intermediate components also used. Thus, for example, a signal that travels from wire bundle 402 to microprocessor 702 with no intermediate components would be a direct signal. In this case, the microprocessor's operation may be said to be based directly on the signal. In another example, a signal that travels from wire bundle 402 to microprocessor 702 with one or more intermediate components (such as receiver 700) would be an indirect signal. In this case, the microprocessor's operation may be said to be based indirectly on the signal—regardless of what and how many intermediate components may be used. As another example, a wireless signal that travels from transponder 800 to microprocessor 702 with no intermediate components would be a direct signal. In this case, the microprocessor's operation may be said to be based directly on the wireless signal. In yet another example, a wireless signal that travels from transponder 800 to microprocessor 702 with one or more intermediate components (such as receiver 700) would be an indirect wireless signal. In this case, the microprocessor's operation may be said to be based indirectly on the wireless signal—regardless of what and how many intermediate components may be used.

With reference now to FIGS. 1 and 1A, to use this invention in some embodiments, the operator may first acquire the proper wire bundle 402 to match the vehicle's trailer plug 202 and the auxiliary lighting system 114 including the controller 600. The operator may then attach the wire bundle 402 to the vehicle—embodiments of this attachment are described above. The operator may then electrically connect one end of the wire bundle 402, which may include the auxiliary plug 400, into the trailer plug 202. The operator may then connect the opposite end to the controller 600 or to another component which is ultimately connected to the controller 600. This may complete the attachment. In use, the operator may simply adjust the vehicle lights, typically using vehicle light controls within the vehicle, to match the atmospheric light condition. If the atmospheric light condition is relatively lighter, there may be no need to turn on the vehicle lights. As a result, the trailer plug 202 may indicate that no tail lights are required. The microprocessor 702 may use that indication to keep the auxiliary headlight(s) in an off condition. If the atmospheric light condition is relatively darker, there may be a need for the operator to turn on the vehicle lights. As a result of the operator turning on the vehicle lights, the trailer plug 202 may indicate that tail lights are required. The microprocessor 702 may use that indication to place the auxiliary headlight(s) in an on condition. Turn signals, if applicable, may be used as described above. Similarly, a brake signal, if applicable, may be used as described above.

With reference now to FIGS. 1 and 1A, to use this invention in some embodiments, the operator may first acquire the proper transponder 800 to match the vehicle's trailer plug 202 and the auxiliary lighting system 114 including the controller 600. The operator may then attach the transponder 800 to the vehicle—embodiments of this attachment are described above. The operator may then electrically connect the transponder 800 to the trailer plug 202. Embodiments for this connection are described above.

This may complete the attachment. In use, the operator may simply adjust the vehicle lights, typically using vehicle light controls within the vehicle, to match the atmospheric light condition. If the atmospheric light condition is relatively lighter, there may be no need to turn on the vehicle lights. As a result, the trailer plug 202 may indicate that no tail lights are required. The microprocessor 702 may use that indication to keep the auxiliary headlight(s) in an off condition. If the atmospheric light condition is relatively darker, there may be a need for the operator to turn on the vehicle lights. As a result of the operator turning on the vehicle lights, the trailer plug 202 may indicate that tail lights are required. The microprocessor 702 may use that indication to place the auxiliary headlight(s) in an on condition. Turn signals, if applicable, may be used as described above. Similarly, a brake signal, if applicable, may be used as described above.

As described above, the present disclosure has been described with preferred embodiments thereof and it is understood that many changes and modifications to the described embodiments can be carried out without departing from the scope and the spirit of the present disclosure that is intended to be limited only by the appended claims.

Having thus described the invention, it is now claimed:

1. An auxiliary apparatus for use with an associated vehicle having: at least one vehicle light wherein the at least one vehicle light includes a headlight having a low beam and a high beam; an operator adjustable light control that permits a user to control the vehicle light, a battery; and, an electric plug that is electrically connected to the vehicle light; the auxiliary apparatus comprising: an auxiliary snow and/or ice removal implement that is removably mountable to the associated vehicle; an auxiliary lighting system that: is designed for use with the auxiliary implement; has at least one auxiliary light designed to illuminate a ground surface upon which the associated vehicle travels; and, the at least one auxiliary light includes a low beam and a high beam; a user operable device that is designed to operate at least one function of the auxiliary snow and/or ice removal implement; a first wiring harness that: has a first electrical connector that is a power connector; has a second electrical connector that is electrically connectable to the at least one auxiliary light; has a third electrical connector that is electrically hardwire connectable to the auxiliary implement; and, has a fourth electrical connector; a second wiring harness that: has a first end that is electrically connectable to the vehicle battery; has a second end with a power connector that is electrically hardwire connectable to the power connector of the first wiring harness; and, is designed to transmit power from the vehicle battery to the power connector of the first wiring harness to power the auxiliary snow and/or ice removal implement; a third wiring harness that: has a first connector that is electrically hardwire connectable to the vehicle electric plug; has a second connector that is electrically hardwire connectable to the fourth electrical connector of the first wiring harness; has a third connector that is designed to be connected to the user operable device; and, is designed to transmit an electrical signal from the vehicle electric plug to the first wiring harness; a relay pack that: has a first and second normally closed relay that are electrically connectable to the vehicle headlight low beam, the at least one auxiliary light low beam, and the user operable device; has a third and fourth normally closed relay that are electrically connectable to the vehicle headlight high beam, the at least one auxiliary light high beams, and the user operable device; and, wherein when the first, second, and third wiring harnesses are connected: the user operable device is operable to operate the at least one function of the auxiliary snow and/or ice removal implement; and, the operator adjustable light control is operable to control the at least one auxiliary light.

2. The auxiliary apparatus of claim 1 wherein:
the auxiliary lighting system further comprises a microprocessor;
the second electrical connector of the first wiring harness is electrically connectable to the microprocessor; and,
the microprocessor is programmed to operate the at least one auxiliary light based on the electrical signal.

3. The auxiliary apparatus of claim 1 wherein:
the auxiliary lighting system further comprises an adapter having: a first end that is electrically connectable to the vehicle electric plug; a first outlet that is electrically connectable to the first connector of the third wiring harness; and, a second outlet that is electrically hardwire connectable to electrically connect the vehicle electric plug to a component.

4. The auxiliary apparatus of claim 1 wherein the auxiliary snow and/or ice removal implement is a snowplow assembly.

5. The auxiliary apparatus of claim 1 wherein the auxiliary snow and/or ice removal implement is a spreader.

6. The auxiliary apparatus of claim 1 further comprising:
a sensor that is operable to turn off the at least one auxiliary light when the at least one vehicle light is turned off.

7. A method for use with an associated vehicle having: at least one vehicle light wherein the at least one vehicle light includes a headlight having a low beam and a high beam; an operator adjustable light control that permits a user to control the vehicle light, a battery; and, an electric plug that is electrically connected to the vehicle light; the method comprising the steps of:

A: providing an auxiliary apparatus comprising:
an auxiliary snow and/or ice removal implement comprising at least one operable function; an auxiliary lighting system that: is designed for use with the auxiliary implement; has at least one auxiliary light designed to illuminate a ground surface upon which the associated vehicle travels; and, the at least one auxiliary light includes a low beam and a high beam; a user operable device that is designed to operate the at least one operable function of the auxiliary snow and/or ice removal implement; a first wiring harness that: has a first electrical connector that is a power connector; has a second electrical connector that is electrically connectable; has a third electrical connector that is electrically hardwire connectable; and, has a fourth electrical connector; a second wiring harness that: has a first end; and, has a second end with a power connector that is electrically hardwire connectable;
a third wiring harness that: has a first connector that is electrically hardwire connectable; has a second connector that is electrically hardwire connectable; and, has a third connector; a relay pack that: has a first and second normally closed relay that are electrically connectable to the vehicle headlight low beam, the at least one auxiliary light low beam, and the user operable device; has a third and fourth normally closed relay that are electrically connectable to the vehicle headlight high beam, the at least one auxiliary light high beams, and the user operable device; wherein the auxiliary apparatus is operable according to the following steps:

B: mounting the auxiliary snow and/or ice removal implement to the associated vehicle;

C: mounting the auxiliary lighting system to at least one of: the auxiliary snow and/or ice removal implement; and, the associated vehicle;
D: securing the first, second, and third wiring harnesses to at least one of: the auxiliary snow and/or ice removal implement; and, the associated vehicle;
E: electrically connecting the second electrical connector of the first wiring harness to the at least one auxiliary light;
F: electrically hardwire connecting the third electrical connector of the first wiring harness to the auxiliary implement;
G: electrically connecting the first end of the second wiring harness to the vehicle battery;
H: electrically hardwire connecting the power connector of the second wiring harness to the power connector of the first wiring harness to enable power to be transmitted from the vehicle battery to the auxiliary snow and/or ice removal implement;
I: electrically hardwire connecting the first connector of the third wiring harness to the vehicle electric plug;
J: electrically hardwire connecting the second connector of the third wiring harness to the fourth electrical connector of the first wiring harness;
K: electrically hardwire connecting the third connector of the third wiring harness to the user operable device to enable an electric signal to be transmitted from the vehicle electric plug to the first wiring harness;
L: electrically connecting the first and second relays to the vehicle headlight's low beam wiring harness;
M: electrically connecting the first and second relays to the at least one auxiliary light's low beam;
N: electrically connecting the third and fourth relays to the vehicle headlight's high beam wiring harness;
O: electrically connecting the third and fourth relays to the at least one auxiliary light's high beam;
P: electrically connecting the first, second, third, and fourth relays to the user operable device;
Q: manually operating the user operable device to operate the at least one function of the auxiliary snow and/or ice removal implement; and,
R: manually operating the operator adjustable light control to control the at least one auxiliary light.

8. The method of claim 7 wherein:
step A comprises the step of: providing auxiliary apparatus with a microprocessor;
step E comprises the step of: electrically connecting the second electrical connector of the first wiring harness to the microprocessor; and, wherein the microprocessor is programmed to operate the at least one auxiliary light based on the electrical signal.

9. The method of claim 7 wherein:
step A comprises the step of: providing auxiliary apparatus with an adapter having: a first end that is electrically connectable to the vehicle electric plug; a first outlet that is electrically connectable to the first connector of the third wiring harness; and, a second outlet that is electrically connectable to electrically connect the vehicle electric plug to another component; step I comprises the steps of: electrically hardwire connecting the first end of the adapter to the vehicle electric plug; and, electrically hardwire connecting the first connector of the third wiring harness to the first outlet of the adapter; and, the method further comprises the steps of: providing a component; and, electrically hardwire connecting the component to the second outlet of the adapter.

10. The method of claim 7 wherein the auxiliary apparatus comprises a sensor that is operable to turn off the at least one auxiliary light when the at least one vehicle light is turned off.

11. The method of claim 7 wherein the auxiliary apparatus is designed so that steps B through K are safely accomplished without the aid of an electrical technician.

12. The method of claim 7 wherein the auxiliary apparatus is designed so that no wire splicing is required.

13. The method of claim 7 wherein:
the associated vehicle comprises a computer used to control the at least one vehicle light; and,
no reset or adjustments to the computer are required.

14. An apparatus comprising:
a vehicle comprising: at least one vehicle light wherein the at least one vehicle light includes a headlight having a low beam and a high beam; an operator adjustable light control that permits a user to control the vehicle light, a battery; and, an electric plug that is electrically connected to the vehicle light; an auxiliary snow and/or ice removal implement that is removably mountable to the vehicle; an auxiliary lighting system that: is designed for use with the auxiliary implement; has at least one auxiliary light designed to illuminate a ground surface upon which the vehicle travels; and, the at least one auxiliary light includes a low beam and a high beam; a user operable device that is designed to operate at least one function of the auxiliary snow and/or ice removal implement; a first wiring harness that: has a first electrical connector that is a power connector; has a second electrical connector that is electrically connected to the at least one auxiliary light; has a third electrical connector that is electrically hardwire connected to the auxiliary implement; and, has a fourth electrical connector;
a second wiring harness that: has a first end that is electrically connected to the vehicle battery; has a second end with a power connector that is electrically hardwire connected to the power connector of the first wiring harness; and, transmits power from the vehicle battery to the auxiliary snow and/or ice removal implement;
a third wiring harness that: has a first connector that is electrically hardwire connected to the vehicle electric plug; has a second connector that is electrically hardwire connected to the fourth electrical connector of the first wiring harness; has a third connector that is connected to the user operable device; and, transmits an electrical signal from the vehicle electric plug to the first wiring harness;
a relay pack that: has a first and second normally closed relay that are electrically connectable to the vehicle headlight low beam, the at least one auxiliary light low beam, and the user operable device; has a third and fourth normally closed relay that are electrically connectable to the vehicle headlight high beam, the at least one auxiliary light high beams, and the user operable device; wherein the user operable device is operable to operate the at least one function of the auxiliary snow and/or ice removal implement; and, wherein the operator adjustable light control is operable to control the at least one auxiliary light.

15. The apparatus of claim 14 wherein the electric plug is positioned at a rear end of the vehicle.

16. The apparatus of claim 15 wherein:
a conduit is secured to the vehicle and extends substantially from a back of the vehicle to a front of the vehicle; and,
the third wiring harness is secured within the conduit.

17. The apparatus of claim 14 wherein the electric plug is positioned near the vehicle battery.

18. The apparatus of claim 14 wherein:
the auxiliary lighting system further comprises a microprocessor;
the second electrical connector of the first wiring harness is electrically connected to the microprocessor; and,
the microprocessor is programmed to operate the at least one auxiliary light based on the electrical signal.

19. The apparatus of claim 14 wherein:
the auxiliary lighting system further comprises an adapter having: a first end that is electrically connectable to the vehicle electric plug; a first outlet that is electrically connectable to the first connector of the third wiring harness; and, a second outlet that is electrically hard-wire connectable to electrically connect the vehicle electric plug to a component.

20. The apparatus of claim 14 wherein the auxiliary apparatus further comprises a sensor that is operable to turn off the at least one auxiliary light when the at least one vehicle light is turned off.

\* \* \* \* \*